United States Patent
Okada et al.

(10) Patent No.: US 11,595,284 B2
(45) Date of Patent: Feb. 28, 2023

(54) PACKET ANALYSIS DEVICE AND PACKET ANALYSIS METHOD

(71) Applicant: FUJITSU LIMITED, Kawasaki (JP)

(72) Inventors: Sumiyo Okada, Kawasaki (JP); Hitoshi Ueno, Kawasaki (JP); Fumiyuki Iizuka, Kawasaki (JP); Kazutaka Ogihara, Hachioji (JP); Chunghan Lee, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 16 days.

(21) Appl. No.: 16/909,326

(22) Filed: Jun. 23, 2020

(65) Prior Publication Data

US 2021/0021502 A1   Jan. 21, 2021

(30) Foreign Application Priority Data

Jul. 16, 2019 (JP) ............................. JP2019-131130

(51) Int. Cl.
*H04L 12/26* (2006.01)
*H04L 43/0864* (2022.01)
(Continued)

(52) U.S. Cl.
CPC ........ *H04L 43/0864* (2013.01); *H04L 1/1685* (2013.01); *H04L 63/1408* (2013.01); *H04L 63/1466* (2013.01)

(58) Field of Classification Search
CPC ............. H04L 63/1466; H04L 63/1408; H04L 1/1685; H04L 43/0864
See application file for complete search history.

(56) References Cited

U.S. PATENT DOCUMENTS 7,248,564 B1 * 7/2007 Grosdidier .......... H04L 43/0864
370/235
7,337,206 B1 * 2/2008 Wen ........................ H04L 47/29
709/200
(Continued)

FOREIGN PATENT DOCUMENTS

JP          2014-179938          9/2014
JP          2015-76780           4/2015

OTHER PUBLICATIONS

European Office Action dated May 28, 2021 from European Patent Application No. 20182229.3, 6 pages.
(Continued)

*Primary Examiner* — Vance M Little
(74) *Attorney, Agent, or Firm* — Staas & Halsey LLP

(57) ABSTRACT

The process includes acquiring, from a relay device that relays a packet between a first communication device and a second communication device, a plurality of first delay times generated by a round trip of the packet between the first communication device and the relay device, and a plurality of second delay times generated by a round trip of the packet between the second communication device and the relay device, sorting separately the plurality of first delay times and the plurality of second delay times based on a length of a delay time, and calculating device delay times based on a first delay calculation that calculates a difference between each of the plurality of first delay times and each of the plurality of second delay times in a same rank after the sorting.

15 Claims, 21 Drawing Sheets

(51) Int. Cl.
    *H04L 1/1607*    (2023.01)
    *H04L 9/40*    (2022.01)

(56) References Cited

U.S. PATENT DOCUMENTS

| | | | |
|---|---|---|---|
| 2009/0310509 A1* | 12/2009 | Kumai | H04W 48/18 |
| | | | 370/254 |
| 2012/0163191 A1 | 6/2012 | Tokimizu et al. | |
| 2015/0023189 A1 | 1/2015 | Okada et al. | |
| 2016/0127247 A1* | 5/2016 | Anzai | H04L 47/25 |
| | | | 370/230 |
| 2016/0248577 A1* | 8/2016 | Ilyas | H04J 3/0667 |
| 2021/0195498 A1* | 6/2021 | Otsuya | H04W 40/12 |

OTHER PUBLICATIONS

Extended European Search Report dated Nov. 19, 2020 from European Application No. 20182229.3, 9 pages.
Office Action dated May 2, 2022 for European Application No. 20182229.3.
Office Action dated Aug. 3, 2022 for Chinese Application No. 202010662541.6.
Office Action dated Dec. 28, 2022 for Chinese Application No. 202010662541.6.

\* cited by examiner

FIG. 1
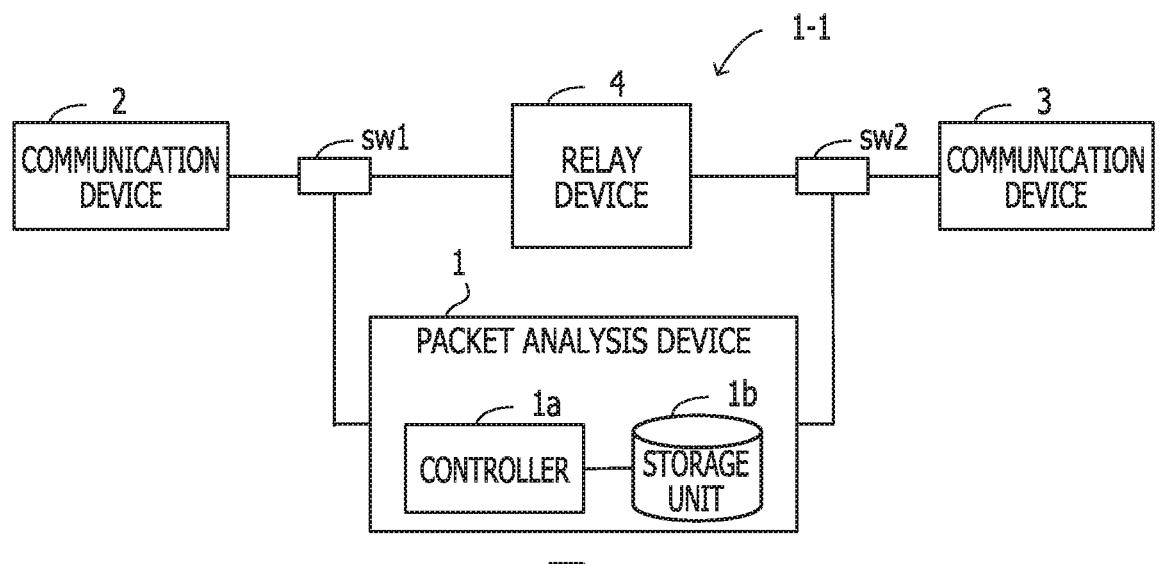
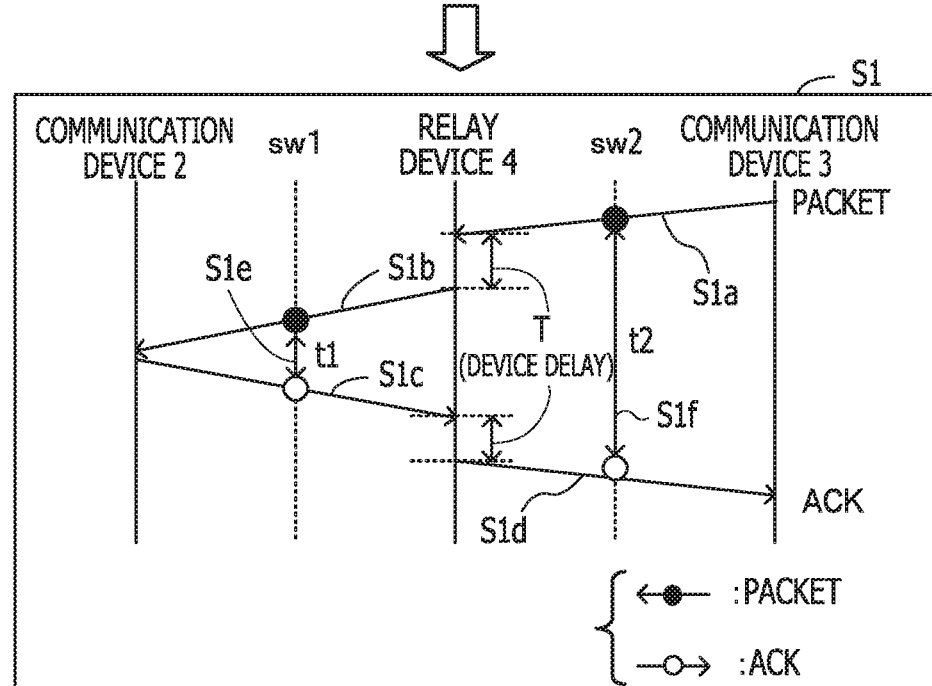
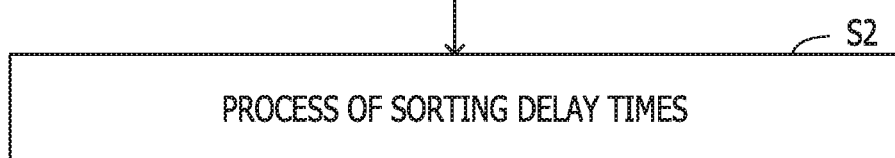
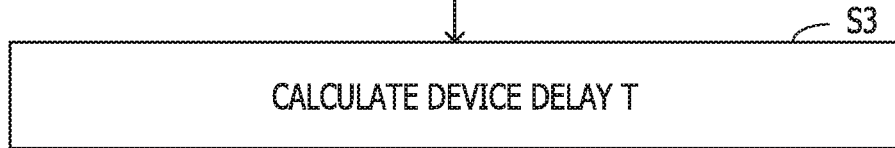

Ta1

| TIME | NUMBER OF SAMPLES | FW DELAY MAXIMUM VALUE (CORRECT ANSWER VALUE) | FW DELAY MAXIMUM VALUE (SORTING DELAY CALCULATION) | FW DELAY MAXIMUM VALUE (AVERAGE DELAY CALCULATION) |
|---|---|---|---|---|
| 16:41 | 7 | 134 | 134 | 114.7143 |
| 16:42 | 7 | 570 | 570 | 185.8571 |
| 16:43 | 6 | 190 | 190 | 104.8333 |
| 16:44 | 3 | 520 | 520 | 429 |
| 16:45 | 4 | 118 | 118 | 114 |
| 16:46 | 6 | 1412 | 1412 | 897.1667 |
| 16:47 | 5 | 128 | 128 | 113.2 |
| 16:48 | 12 | 150 | 150 | 105.8333 |
| 16:49 | 12 | 119 | 119 | 99.83333 |
| 16:50 | 4 | 530 | 530 | 319.25 |

| TIME | NUMBER OF SAMPLES | FW DELAY MAXIMUM VALUE (CORRECT ANSWER VALUE) | FW DELAY MAXIMUM VALUE (SORTING DELAY CALCULATION) | FW DELAY MAXIMUM VALUE (AVERAGE DELAY CALCULATION) |
|---|---|---|---|---|
| 16:41 | 10 | 1048 | 1036 | 615.1 |
| 16:42 | 6 | 881 | 782 | 363.8333 |
| 16:43 | 7 | 174 | 174 | 109 |
| 16:44 | 6 | 1250 | 1250 | 740.8333 |
| 16:45 | 10 | 247 | 247 | 114.4 |
| 16:46 | 11 | 1070 | 1070 | 791.818 |
| 16:47 | 6 | 1297 | 1297 | 1027.333 |
| 16:48 | 101 | 3455 | 2339 | 1115.871 |
| 16:49 | 5 | 724 | 724 | 416.4 |
| 16:50 | 4 | 510 | 510 | 309.5 |

Ta2

PACKET ANALYSIS DEVICE AND PACKET ANALYSIS METHOD

CROSS-REFERENCE TO RELATED APPLICATION

This application is based upon and claims the benefit of priority of the prior Japanese Patent Application No. 2019-131130, filed on Jul. 16, 2019, the entire contents of which are incorporated herein by reference.

FIELD

The embodiments discussed herein are related to a packet analysis device and a packet analysis method.

BACKGROUND

A firewall (FW) device is used as a security measure of a communication network. The firewall device is installed at a packet relay point and performs a packet monitoring, so as to detect and prevent a data leakage from an internal network caused by a virus infection, an attack by a transmission of a virus file from an external network, or the like.

As a technology related to the packet monitoring, for example, a technology has been proposed which identifies an information processing system to which a packet has been transmitted, and monitors a delay in processing of the packet, based on packet information and identification information provided from a probe. Further, a technology has been proposed which estimates a location of a cause of deterioration in quality of communication between devices, by calculating a characteristic value related to the communication between devices, and determining the normality of the characteristic value.

Related technologies are disclosed in, for example, Japanese Laid-Open Patent Publication Nos. 2015-076780 and 2014-179938.

SUMMARY

According to an aspect of the embodiments, a non-transitory computer-readable recording medium having stored therein a packet analysis program that causes a computer to execute a process, the process includes acquiring, from a relay device that relays a packet between a first communication device and a second communication device, a plurality of first delay times generated by a round trip of the packet between the first communication device and the relay device, and a plurality of second delay times generated by a round trip of the packet between the second communication device and the relay device, sorting separately the plurality of first delay times and the plurality of second delay times based on a length of a delay time, and calculating device delay times based on a first delay calculation that calculates a difference between each of the plurality of first delay times and each of the plurality of second delay times in a same rank after the sorting.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a view illustrating an example of a packet analysis system according to a first embodiment;

DESCRIPTION OF EMBODIMENTS

Figure 2:
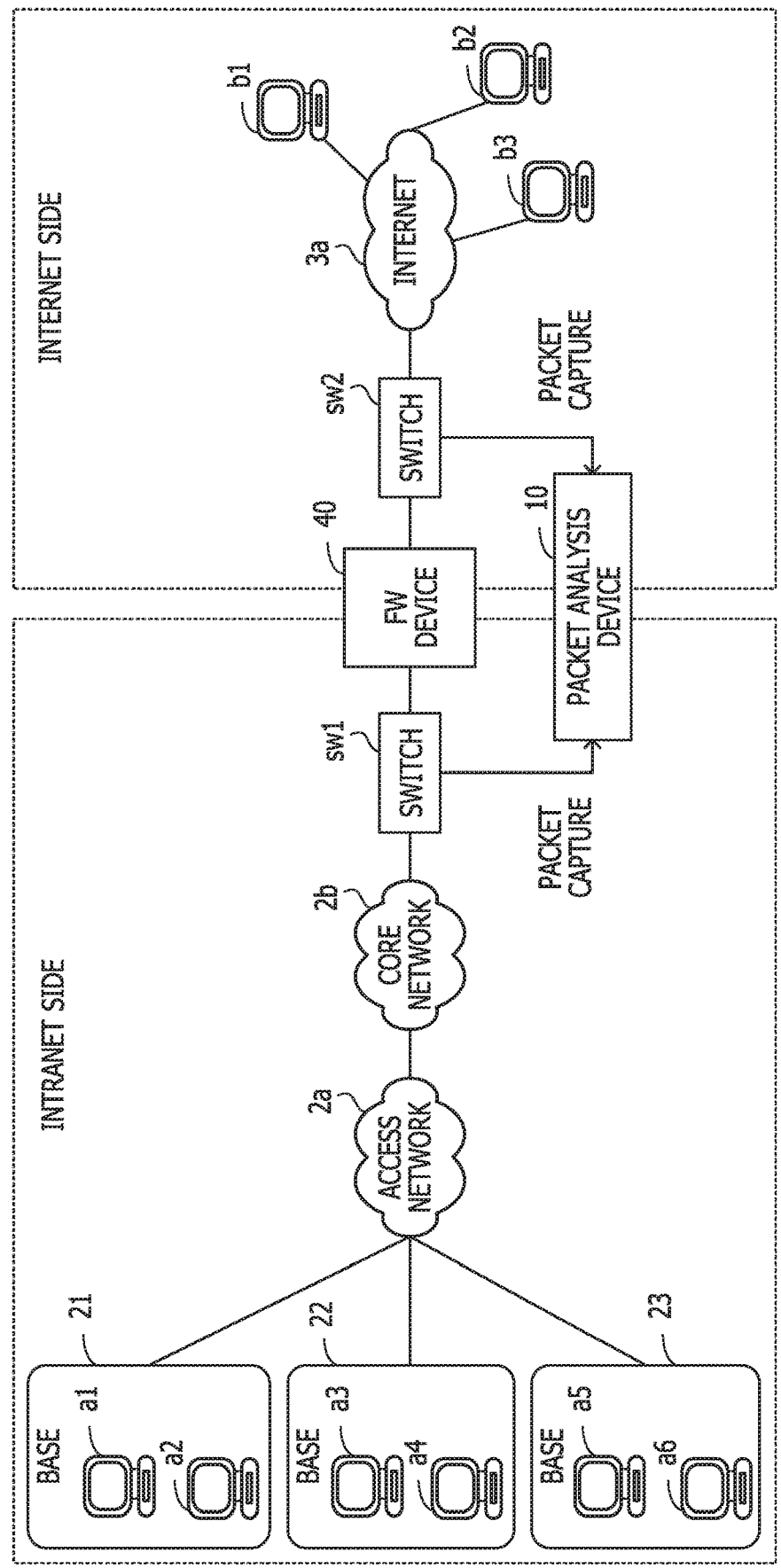
FIG. 2 is a view illustrating an example of a packet analysis system according to a second embodiment.

The firewall device may enter into an overloaded state when a device delay occurs due to the preventing measure as described above. When the firewall device continuously operates in the overloaded state, the communication quality of a normal communication may be degraded. Thus, there is a demand for a technology capable of calculating a device delay of the firewall device with a high accuracy.

Hereinafter, descriptions will be made on embodiments of a technology capable of calculating a device delay with a high accuracy.

First Embodiment

A first embodiment will be described with reference to FIG. 1. FIG. 1 is a view illustrating an example of a packet analysis system according to the first embodiment. A packet analysis system 1-1 includes communication devices 2 and 3, a relay device 4, switches sw1 and sw2, and a packet analysis device 1.

The relay device 4 relays a packet communication between the communication devices 2 and 3. In addition, the switch sw1 is provided in a transmission path between the communication device 2 and the relay device 4, and the switch sw2 is provided in a transmission path between the communication device 3 and the relay device 4. The packet analysis device 1 is coupled to the switches sw1 and sw2, so as to acquire packets that flow through the relay device 4, from the switches sw1 and sw2, and analyze the packets.

The packet analysis device 1 includes a controller 1a and a storage unit 1b. The controller 1a acquires a first delay time generated from a round trip of a packet between the communication device 2 and the relay device 4, and a second delay time generated from a round trip of a packet between the communication device 3 and the relay device 4. The first or second delay time corresponds to, for example, a round-trip time (RTT) which is the time for a signal to be sent plus the time for an acknowledge of the signal to be received.

The controller 1a calculates a device delay by a sorting delay calculation that separately sorts first delay times and second delay times based on the length of a delay time, and calculates a difference between a first delay time and a second delay time in the same rank after the sorting. The storage unit 1b stores data related to a packet analysis, such as the acquired delay times or the delay calculation result.

The flow of the operation will be described using the example illustrated in FIG. 1.

(Operation S1) The device delay of the relay device 4 is calculated along the processes of operations S1a to S1f below.

(Operation S1a) The communication device 3 transmits a packet. The packet is transmitted to the relay device 4 via the switch sw2.

(Operation S1b) When the packet is received, the relay device 4 relays and transmits the packet. The packet is transmitted to the communication device 2 via the switch sw1.

(Operation S1c) When the packet is received in a normal condition, the communication device 2 transmits an ACK (ACK packet). The ACK is transmitted to the relay device 4 via the switch sw1.

(Operation S1d) When the ACK is received, the relay device 4 relays and transmits the ACK. The ACK is transmitted to the communication device 3 via the switch sw2.

(Operation S1e) The controller 1a acquires a delay time t1 (a first delay time), based on a time when the packet is captured through the switch sw1 and a time when the ACK is captured through the switch sw1. The delay time t1 corresponds to an RTT from the time when the relay device 4 receives the packet to the time when the relay device 4 receives the ACK.

(Operation S1f) The controller 1a acquires a delay time t2 (a second delay time) based on a time when the packet is captured through the switch sw2 and a time when the ACK is captured through the switch sw2. The delay time t2 corresponds to an RTT from the time when the relay device 4 receives the packet to the time when the relay device 4 receives the ACK.

(Operation S2) It is assumed that a plurality of delay times t1 and a plurality of delay times t2 are acquired by the process of operation S1. The controller 1a sorts the delay times t1, and also sorts the delay times t2.

(Operation S3) The controller 1a calculates a device delay T by the sorting delay calculation that calculates a difference between a delay time t1 and a delay time t2 in the same rank after the sorting.

For example, the controller 1a sorts the delay times t1 in an ascending order, and also sorts the delay times t2 in an ascending order. Then, the controller 1a calculates a difference between a delay time t1 and a delay time t2 in the same rank after the sorting, so as to calculate the device delay T.

As described above, the packet analysis device 1 acquires the delay times t1 generated between the communication device 2 and the relay device 4 and the delay times t2 generated between the communication device 3 and the relay device 4, from the packets captured before and after the relay device 4. Then, the packet analysis device 1 separately sorts the delay times t1 and the delay times t2 that have been acquired, and calculates a difference between a delay time t1 and a delay time t2 in the same rank after the sorting, so as to calculate the device delay.

With this control, the packet analysis device 1 does not require an association of connections to be described later, and is able to calculate the device delay occurring in the relay device 4 with a high accuracy, as compared to a case where the association of connections is performed.

Second Embodiment

Next, a second embodiment will be described. In the second embodiment, the relay device is a firewall device (hereinafter, referred to as an "FW device"), and an overloaded state of the FW device is detected based on a delay occurring in the FW device. Hereinafter, the delay occurring in the FW device may be referred to as an FW delay.

[System Configuration]

FIG. 2 is a view illustrating an example of a packet analysis system according to the second embodiment. A packet analysis system 1-2 includes hosts a1 to a6, hosts b1 to b3, an access network 2a, a core network 2b, switches sw1 and sw2, Internet 3a, an FW device 40, and a packet analysis device 10.

The hosts a1 to a6, the access network 2a, the core network 2b, and the switch sw1 are positioned on the Intranet side, and the switch sw2, the Internet 3a, and the hosts b1 to b3 are positioned on the Internet side.

Each base 21, 22 or 23 is coupled to the access network 2a. The base 21 includes the hosts a1 and a2, the base 22 includes the hosts a3 and a4, and the base 23 includes the hosts a5 and a6.

The core network 2b is coupled to the access network 2a and the switch sw1. The Internet 3a is coupled to the hosts b1 to b3 and the switch sw2. The FW device 40 and the packet analysis device 10 are each coupled to the switches sw1 and sw2.

The packet analysis device 10 acquires a packet that flows from the Intranet side to the FW device 40, through the switch sw1. Similarly, the packet analysis device 10 acquires a packet that flows from the Internet side to the FW device 40, through the switch sw2. Then, the packet analysis device 10 calculates a FW delay occurring in the FW device 40 based on the acquired packets.

[FW Delay for Each Connection]

When the FW delay is calculated using time stamps of packets captured before and after the FW device 40, the calculation amount becomes enormous, and thus, the calculation is not effective. Thus, it may be conceivable that the FW delay is calculated for each connection. In this case, it is required to associate a connection present at the previous stage of the FW device 40 and a connection present at the subsequent stage of the FW device 40 with each other.

Figure 3:
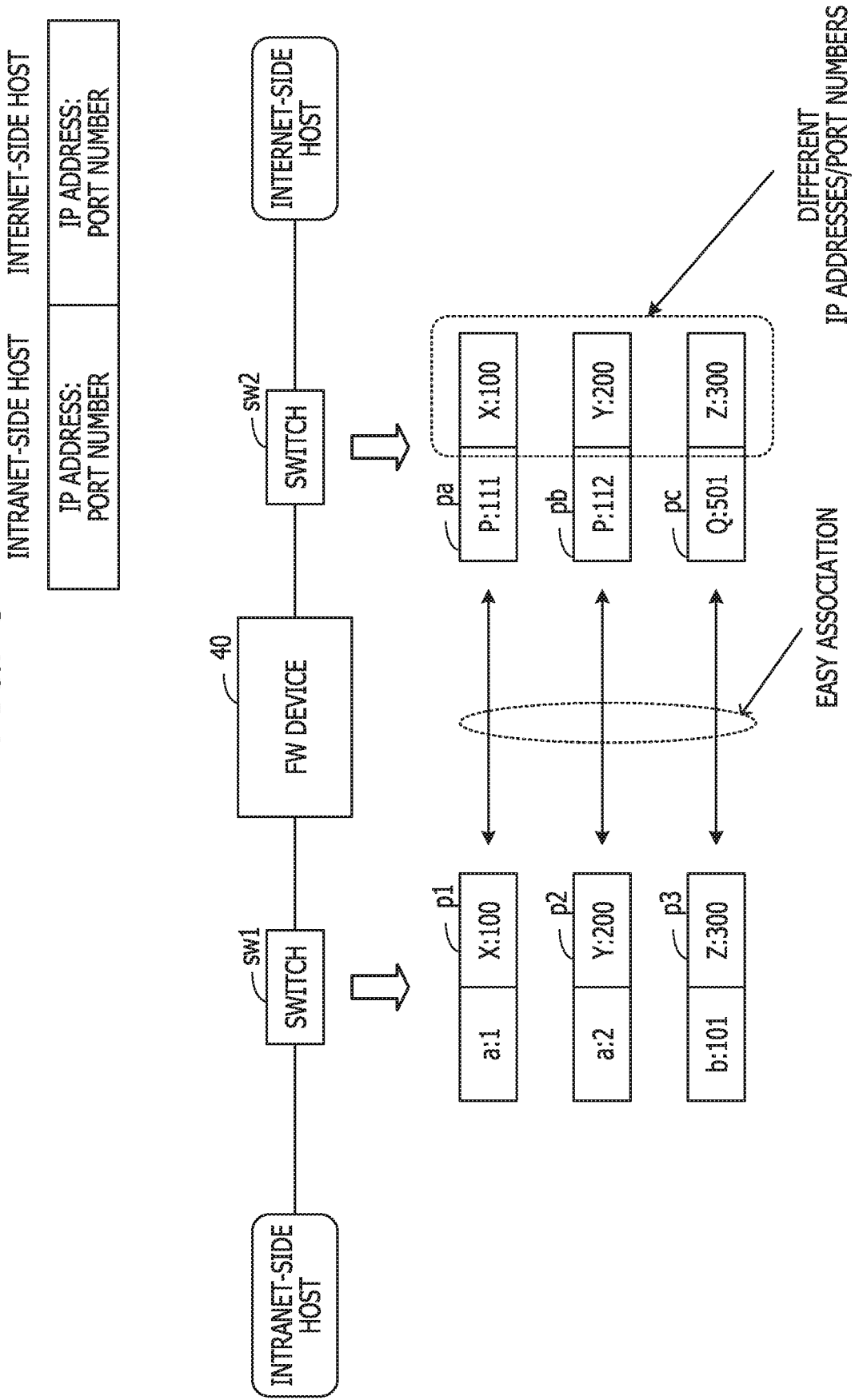
FIG. 3 is a view illustrating an example of an association of connections.

FIG. 3 is a view illustrating an example of the association of connections. FIG. 3 represents a case where one Intranet-side host and one Internet-side host conduct a one-to-one communication (one connection).

In general, connections are associated with each other based on an IP address/port number of a source side and an IP address/port number of a destination side. Further, the FW device 40 performs a NAPT (network address port translation) conversion of the IP address/port number of the Intranet-side host.

Here, among the packets p1, p2, and p3 captured by the switch sw1, the packet p1 has the IP address/port number of the Intranet-side host as (a:1), and the IP address/port number of the Internet-side host as (X:100).

Further, the packet p2 has the IP address/port number of the Intranet-side host as (a:2), and the IP address/port number of the Internet-side host as (Y:200). Further, the packet p3 has the IP address/port number of the Intranet-side host as (b:101), and the IP address/port number of the Internet-side host as (Z:300).

Meanwhile, the FW device 40 performs the NAPT conversion on the IP addresses/ports number of the Intranet-side host in each of the packets p1, p2, and p3. In a packet pa captured at the switch sw2 after the NAPT conversion, the IP address/port number of the Intranet-side host has been converted to (P:111), and the IP address/port number of the Internet-side host remains (X:100).

Further, in a packet pb captured at the switch sw2 after the NAPT conversion, the IP address/port number of the Intranet-side host has been converted to (P:112), and the IP address/port number of the Internet-side host remains (Y:200).

Further, in a packet pc captured at the switch sw2 after the NAPT conversion, the IP address/port number of the Intranet-side host has been converted to (Q:501), and the IP address/port number of the Internet-side host remains (Z:300).

Here, when one connection is set between the Intranet-side host and the Internet-side host, the IP addresses/port numbers of the Internet-side host are different from each other. That is, the IP addresses/port numbers of the Internet-side host in the packets pa, pb, and pc, respectively, are different from each other.

Thus, it is determined that the packet pa matches the IP address/port number of the Internet-side host of (X:100) in the packet p1. Accordingly, the connection on the Intranet side through which the packet p1 flows and the connection on the Internet side through which the packet pa flows are associated with each other.

Further, it is determined that the packet pb matches the IP address/port number of the Internet-side host of (X:200) in the packet p2. Accordingly, the connection on the Intranet side through which the packet p2 flows and the connection on the Internet side through which the packet pb flows are associated with each other.

Further, it is determined that the packet pc matches the IP address/port number of the Internet-side host of (Z:300) in the packet p3. Accordingly, the connection on the Intranet side through which the packet p3 flows and the connection on the Internet side through which the packet pc flows are associated with each other.

In this way, when one Intranet-side host and one Internet-side host communicate with each other, the connection on the Intranet side and the connection on the Internet side may be easily associated with each other.

Figure 4:
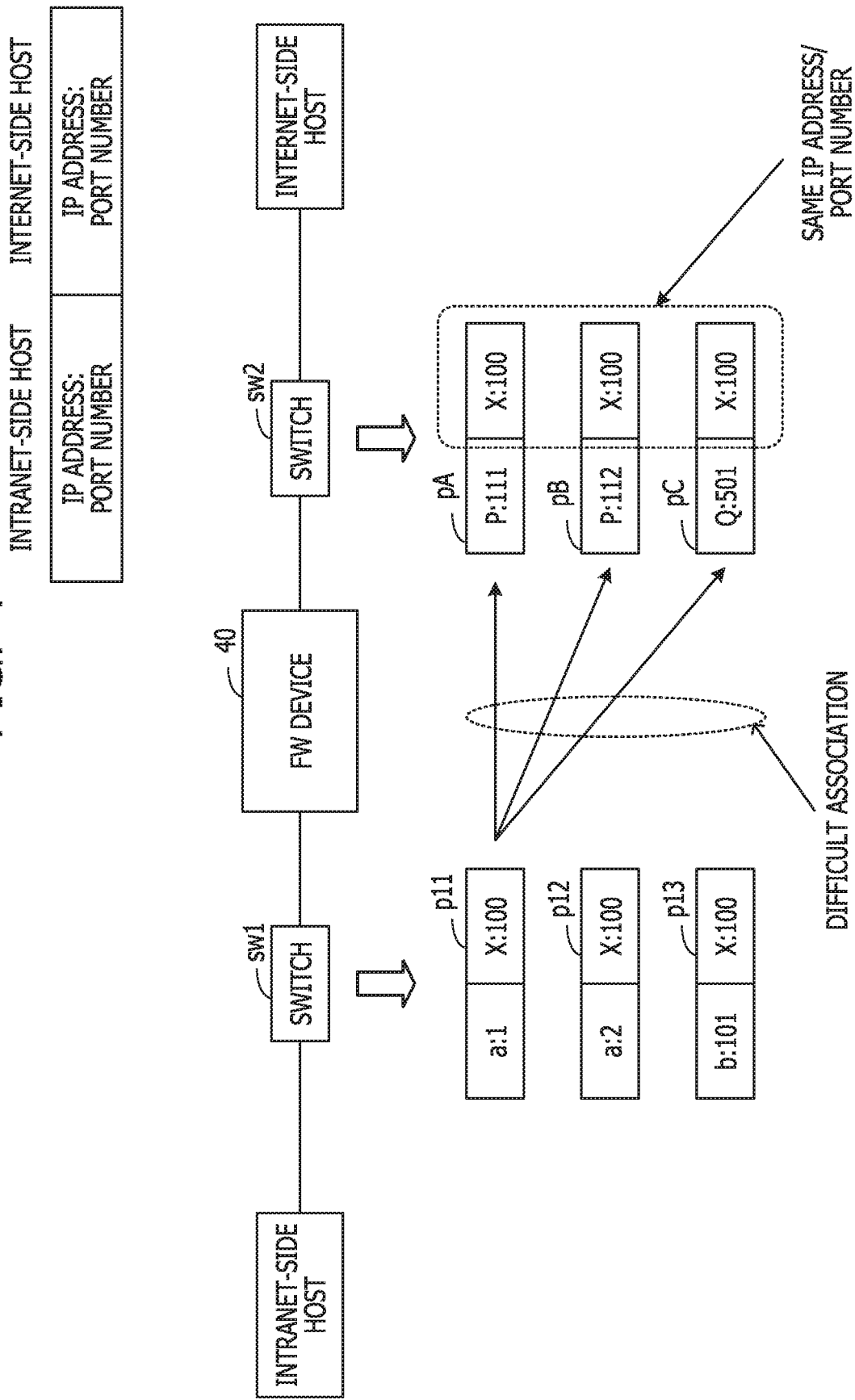
FIG. 4 is a view illustrating an example of an association of connections.

FIG. 4 is a view illustrating an example of the association of connections. FIG. 4 represents a case where multiple Intranet-side hosts and one Internet-side host conduct an n-to-one communication (multiple connections).

Among the packets p11, p12, and p13 captured at the switch sw1, the packet p11 has the IP address/port number of the Intranet-side host as (a:1), and the IP address/port number of the Internet-side host as (X:100).

Further, the packet p12 has the IP address/port number of the Intranet-side host as (a:2), and the IP address/port number of the Internet-side host as (X:100). Further, the packet p13 has the IP address/port number of the Intranet-side host as (b:101), and the IP address/port number of the Internet-side host as (X:100).

Meanwhile, the FW device 40 performs the NAPT conversion on the IP address/port number of the Intranet-side host in each of the packets p11, p12, and p13. In a packet pA captured at the switch sw2 after the NAPT conversion, the IP address/port number of the Intranet-side host has been converted into (P:111), and the IP address/port number of the Internet-side host remains (X:100).

Further, in a packet pB captured at the switch sw2 after the NAPT conversion, the IP address/port number of the Intranet-side host has been converted into (P:112), and the IP address/port number of the Internet-side host remains (X:100).

Further, in a packet pC captured at the switch sw2 after the NAPT conversion, the IP address/port number of the Intranet-side host has been converted into (Q:501), and the IP address/port number of the Internet-side host remains (X:100).

Here, when the multiple Intranet-side hosts access one Internet-side host, the same IP address/port number of the Internet-side host is used. That is, in the packets pA, pB, and pC, the IP addresses/port numbers of the Internet-side host are identically (X:100).

Thus, a packet that matches the IP address/port number of the Internet-side host of (X:100) in the packet p11 is not determined from the packets pA, pB, and pC. Thus, it is difficult to associate the connection on the Intranet side through which the packet p11 flows with the connection on the Internet side through which the packet pA, pB, or pC flows. The same applies to the packets p12 and p13.

As described above, since the FW device 40 performs the NAPT conversion on the IP addresses/port numbers of the Intranet-side hosts, it is difficult to associate the connections at the previous stage and the subsequent stage of the FW device 40 with each other, when multiple connections are set as illustrated in FIG. 4.

Here, when the FW delay is calculated for each connection, it may be conceivable that the delay of the FW device 40 is calculated by excluding non-associated packets. However, this calculation method has a problem in that the calculation with a small amount of data causes an error, and when a large amount of data is collected, it takes time to calculate the FW delay.

The present disclosure has been made in view of the foregoing points, and is capable of efficiently calculating the FW delay occurring in the FW device 40 without performing the association of connections, so as to detect the overloaded state with a further high accuracy.

[Hardware]

Figure 5:
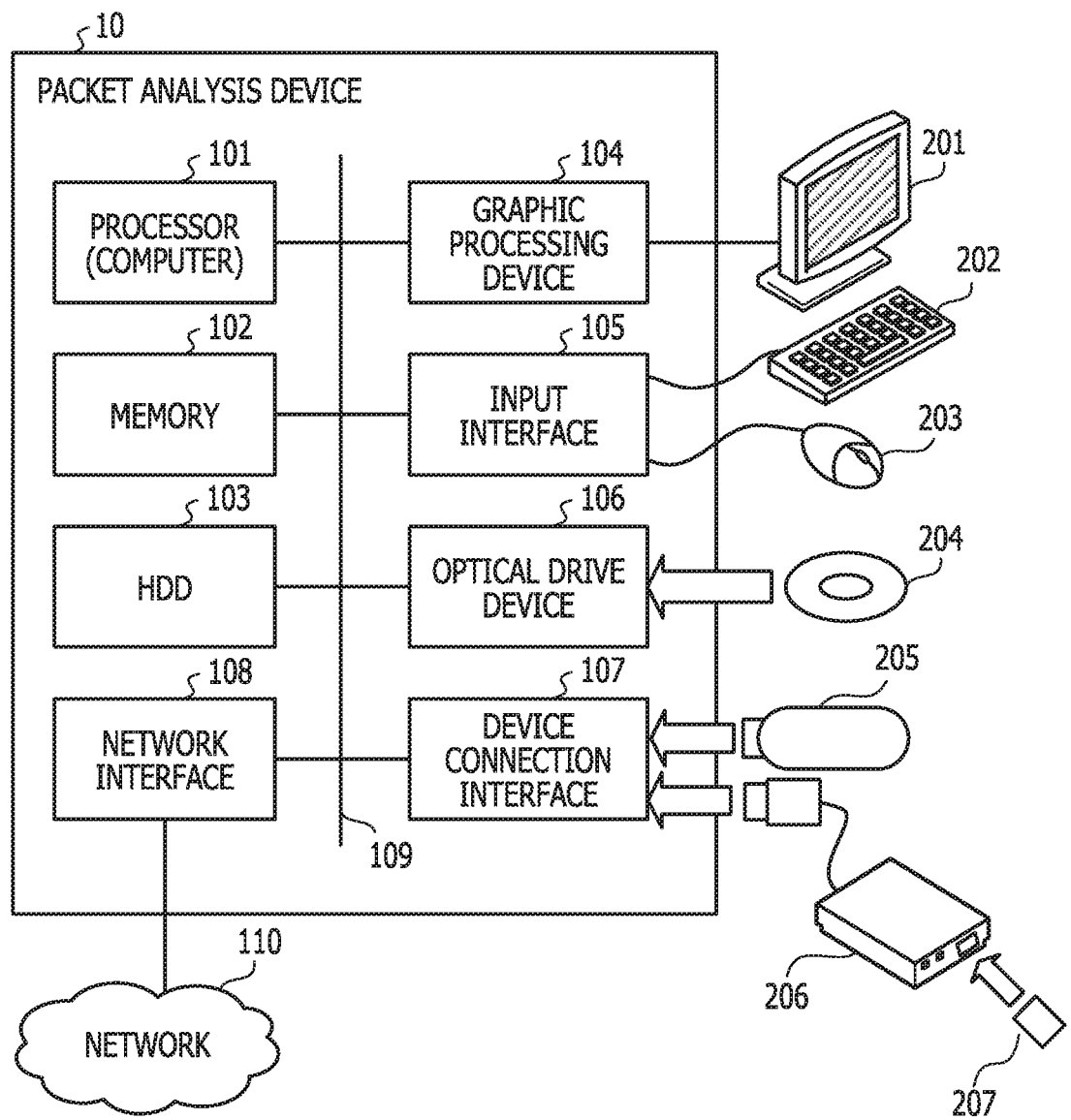
FIG. 5 is a view illustrating an example of hardware of a packet analysis device.

Next, the configuration and operation of the second embodiment will be described in detail. FIG. 5 is a view illustrating an example of hardware of the packet analysis device. The packet analysis device 10 is entirely controlled by a processor 101. A memory 102 and multiple peripheral devices are coupled to the processor 101 via a bus 109. The processor 101 may be a multiprocessor.

The processor 101 is, for example, a CPU (central processing unit), an MPU (micro processing unit), or a DSP (digital signal processor). At least a portion of the functions of the processor 101 may be implemented by an electronic circuit such as an ASIC (application specific integrated circuit) or a PLD (programmable logic device).

The memory 102 is used as a main storage device of the packet analysis device 10. The memory 102 temporarily stores at least a portion of OS (operating system) programs or application programs to be executed by the processor 101. Further, the memory 102 stores various types of data necessary for the processing by the processor 101. As for the memory 102, for example, a volatile semiconductor storage device such as a RAM (random access memory) may be used.

The peripheral devices coupled to the bus 109 include an HDD (hard disk drive) 103, a graphic processing device 104, an input interface 105, an optical drive device 106, a device connection interface 107, and a network interface 108.

The HDD 103 magnetically writes and reads data to/from a built-in disk. The HDD 103 is used as an auxiliary storage device of the packet analysis device 10. The HDD 103 stores OS programs, application programs, and various types of data. In addition, as for the auxiliary storage device, a non-volatile semiconductor storage device such as a flash memory may be used.

A monitor 201 is coupled to the graphic processing device 104. The graphic processing device 104 displays an image on a screen of the monitor 201 according to a command from the processor 101. Examples of the monitor 201 include a display device using a CRT (cathode ray tube), a liquid crystal display device and others.

A keyboard 202 and a mouse 203 are coupled to the input interface 105. The input interface 105 transmits a signal sent from the keyboard 202 or the mouse 203, to the processor 101.

In addition, the mouse 203 is an example of a pointing device, and other pointing devices may be used. Examples of other pointing devices include a touch panel, a tablet, a touch pad, a trackball and others.

The optical drive device 106 reads data recorded on an optical disk 204, using a laser light or the like. The optical disk 204 is a portable recording medium in which data is recorded in a form readable by reflection of light. Examples of the optical disk 204 include a DVD (digital versatile disk), a DVD-RAM, a CD-ROM (compact disk read only memory), a CD-R (recordable)/RW (rewritable) and others.

The device connection interface 107 is a communication interface for connecting the peripheral devices to the packet analysis device 10. For example, the memory device 205 or the memory reader/writer 206 may be coupled to the device connection interface 107. The memory device 205 is a recording medium having a function to communicate with the device connection interface 107. The memory reader/writer 206 is a device that writes data to the memory card 207 or reads data from the memory card 207. The memory card 207 is a card-type recording medium.

The network interface 108 is coupled to a network 110 (including a wireless LAN (local area network)). The network interface 108 transmits and receives data to and from another computer or communication device via the network 110.

With the hardware configuration described above, the processing functions of the second embodiment may be implemented. In addition, the packet analysis device 1 according to the first embodiment may also be implemented by the same hardware as that for the packet analysis device 10 illustrated in FIG. 5.

The packet analysis device 10 implements the processing functions of the second embodiment by executing, for example, programs recorded in a computer-readable recording medium. The programs that describe the processing contents to be executed by the packet analysis device 10 may be recorded in various recording media.

For example, the programs to be executed by the packet analysis device 10 may be stored in the HDD 103. The processor 101 loads at least a portion of the programs in the HDD 103 into the memory 102 and executes the programs. In addition, the programs to be executed by the packet analysis device 10 may be recorded in a portable recording medium such as the optical disk 204, the memory device 205, the memory card 207 or the like.

The programs stored in the portable recording medium are executable after being installed in the HDD 103 under the control from the processor 101. In addition, the processor 101 may read the programs directly from the portable recording medium and execute the programs.

[Functional Blocks]

Figure 6:
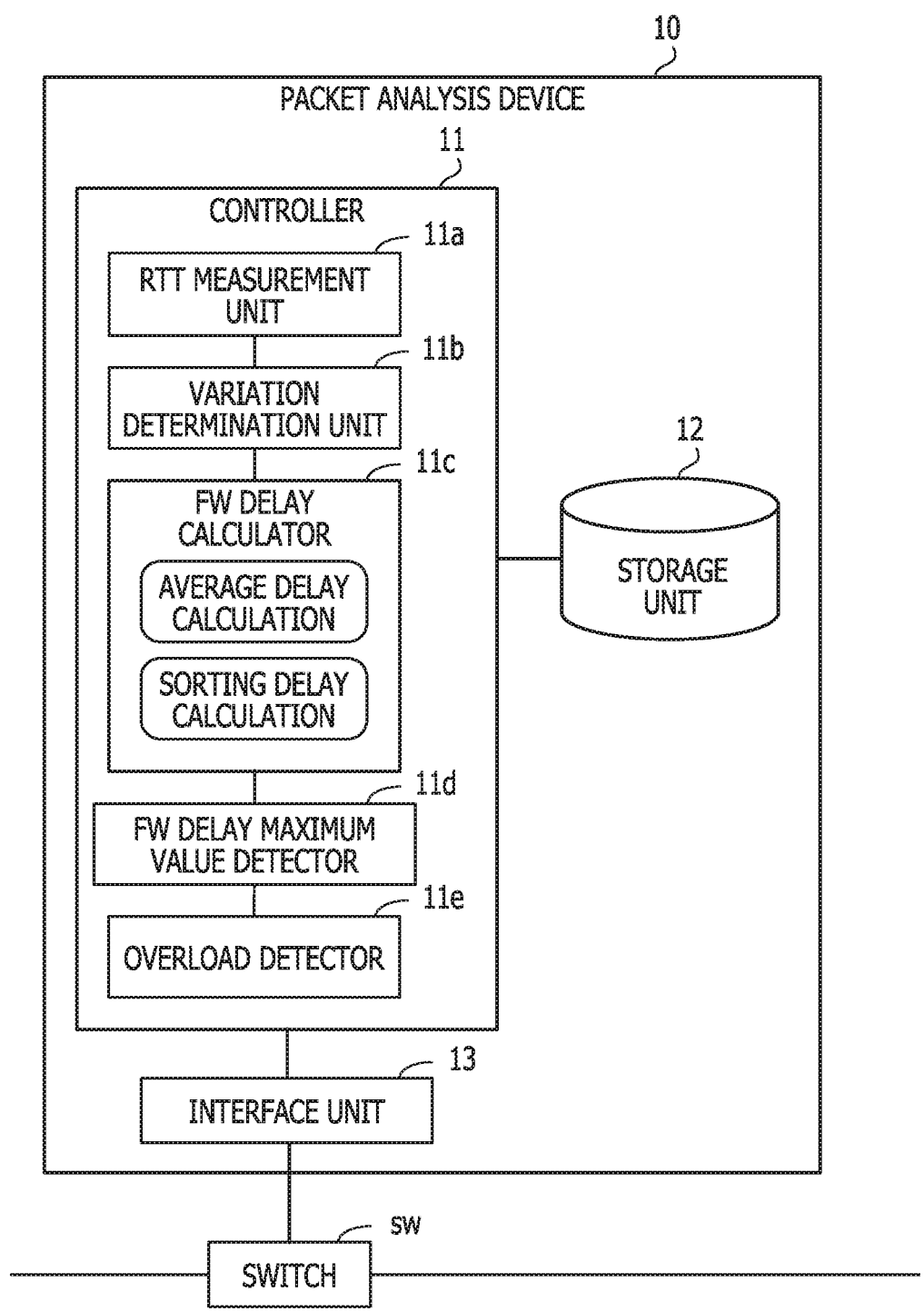
FIG. 6 is a view illustrating an example of functional blocks of the packet analysis device.

FIG. 6 is a diagram illustrating an example of functional blocks of the packet analysis device. In addition, the delay time may be referred to as the RTT herein below. The packet analysis device 10 includes a controller 11, a storage unit 12, and an interface unit 13. The controller 11 includes an RTT measurement unit 11a, a variation determination unit 11b, a FW delay calculator 11c, a FW delay maximum value detector 11d, and an overload detector 11e.

The RTT measurement unit 11a measures RTT1 which is a delay time between the Intranet-side host and the FW device 40, based on a packet captured through the switch sw1. Further, the RTT measurement unit 11a measures RTT2 which is a delay time between the Internet-side host and the FW device 40, based on a packet captured through the switch sw2.

The variation determination unit 11b determines variation degrees of first variation states of RTT1 acquired for a predetermined time period and second variation states of RTT2 acquired for a predetermined time period (the specific contents of the determination process will be described later in FIG. 11 and subsequent figures).

When the variation determination unit 11b outputs a determination result indicating that the first and second variation states are in a specific variation state, the FW delay calculator 11c obtains a first average value of RTT1 and a second average value of RTT2, and calculates the FW delay based on a difference between the first and second average values (hereinafter, also referred to as an average delay calculation). In addition, although described later in FIG. 11 and subsequent figures, the specific variation state corresponds to a state where a variation degree is relatively small.

In addition, when the variation determination unit 11b outputs a determination result indicating that the first and second variation states are not in the specific variation state, the FW delay calculator 11c sorts RTT1 in an ascending order, and also sorts RTT2 in an ascending order. Then, the FW delay calculator 11c obtains a difference between each RTT1 and each RTT2 in an ascending order, so as to calculate the device delay (hereinafter, also referred to as a sorting delay calculation).

The FW delay maximum value detector 11d detects a FW delay maximum value from FW delays calculated for a predetermined time period. The overload detector 11e compares the appearance frequency of the FW delay maximum value in the predetermined time period with a threshold value. When the appearance frequency or ratio of the FW delay maximum value is equal to or more than a predetermined threshold value, the overload detector 11e detects that the FW device 40 is in the overloaded state. When the overloaded state is detected, the overload detector 11e, for example, notifies an alarm.

The storage unit 12 stores data related to the packet analysis such as the acquired RTT, the FW delay calculation result and others. Further, the storage unit 12 stores control information related to the operation state, and others. The interface unit 13 is coupled to the switch sw to perform a communication interface control. Further, the interface unit 13 is coupled to a maintenance terminal or the like, to perform an input/output interface control of external data.

In addition, the controller 11 is implemented by the processor 101 of FIG. 5, and the storage unit 12 is implemented by the memory 102 of FIG. 5. In addition, the interface unit 13 may be implemented by the network interface 108 of FIG. 5.

[FW Delay Calculation]

Figure 7:
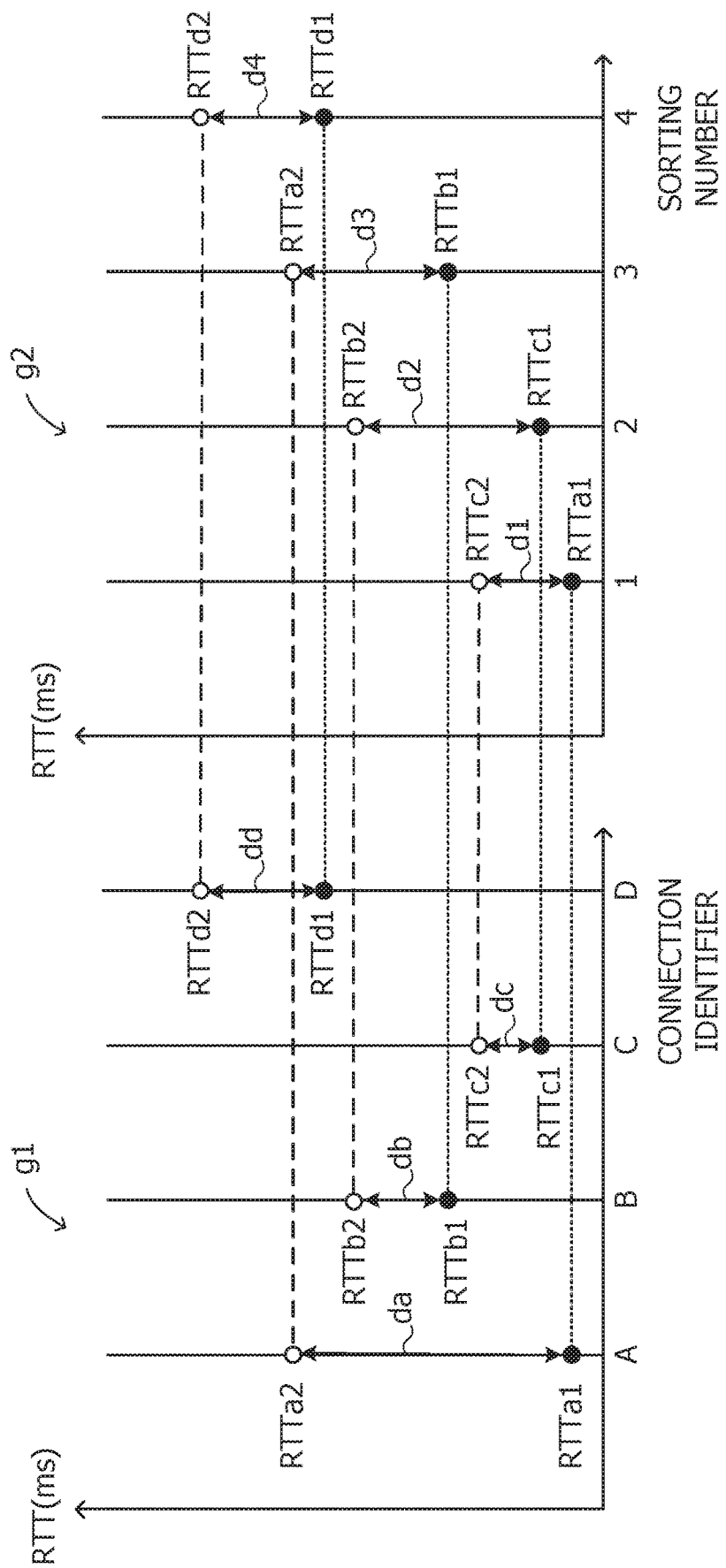
FIG. 7 is a view illustrating an example of an FW delay calculation (sorting delay calculation)

Next, the FW delay calculation will be described with reference to FIGS. 7 and 8. FIG. 7 is a view illustrating an example of the FW delay calculation. FIG. 7 represents an example of the sorting delay calculation. The graph g1 represents the FW delay calculated for each connection. In the graph g1, the vertical axis represents RTT (ms), and the horizontal axis represents a connection identifier. Connections A to D connect the Intranet-side host and the Internet-side host to each other via the FW device 40.

In the connection A, an FW delay da is calculated based on RTTa1 measured through the switch sw1 and RTTa2 measured through the switch sw2. In the connection B, an FW delay db is calculated based on RTTb1 measured through the switch sw1 and RTTb2 measured through the switch sw2.

In the connection C, an FW delay dc is calculated based on RTTc1 measured through the switch sw1 and RTTc2 measured through the switch sw2. In the connection D, an FW delay dd is calculated based on RTTd1 measured through the switch sw1 and RTTd2 measured through the switch sw2.

In this way, the FW delay may be calculated for each connection, as long as a connection between the Intranet-side host and the Internet-side host may be recognized. However, as described above in FIG. 4, it may be difficult to associate an Intranet-side connection set at the previous stage of the FW device 40 and an Internet-side connection set at the subsequent stage of the FW device 40, with each other.

Thus, the packet analysis device 10 does not perform the delay calculation based on the association of connections. In the example represented in the graph g2 of FIG. 7, the packet analysis device 10 sorts RTT1 measured through the switch sw1 in an ascending order, and also sorts RTT2 measured through the switch sw2 in an ascending order. Then, the packet analysis device 10 calculates (RTT2−RTT1) in an ascending order, so as to calculate FW delays.

The graph g2 represents the FW delays calculated based on the sorting of RTT. In the graph g2, the vertical axis represents RTT (ms), and the horizontal axis represents a sorting number (a number given in an order in which RTT is small).

RTT1 measured through the switch sw1 are sorted in an order of RTTa1<RTTc1<RTTb1<RTTd1. RTT2 measured through the switch sw2 are sorted in an order of RTTc2<RTTb2<RTTa2<RTTd2.

Accordingly, in the sorting number 1, an FW delay d1 is calculated based on RTTa1 measured through the switch sw1 and RTTc2 measured through the switch sw2. In the sorting number 2, an FW delay d2 is calculated based on RTTc1 measured through the switch sw1 and RTTb2 measured through the switch sw2.

Further, in the sorting number 3, an FW delay d3 is calculated based on RTTb1 measured through the switch sw1 and RTTa2 measured through the switch sw2. In the sorting number 4, an FW delay d4 is calculated based on RTTd1 measured through the switch sw1 and RTTd2 measured through the switch sw2.

The packet analysis device 10 detects an FW delay maximum value among the FW delays d1 to d4 calculated as described above, and compares the detected FW delay maximum value with a threshold value. Then, when the appearance frequency of the FW delay maximum value is equal to or more than a predetermined threshold value, the packet analysis device 10 determines that the FW device 40 is in the overloaded state.

Figure 8:
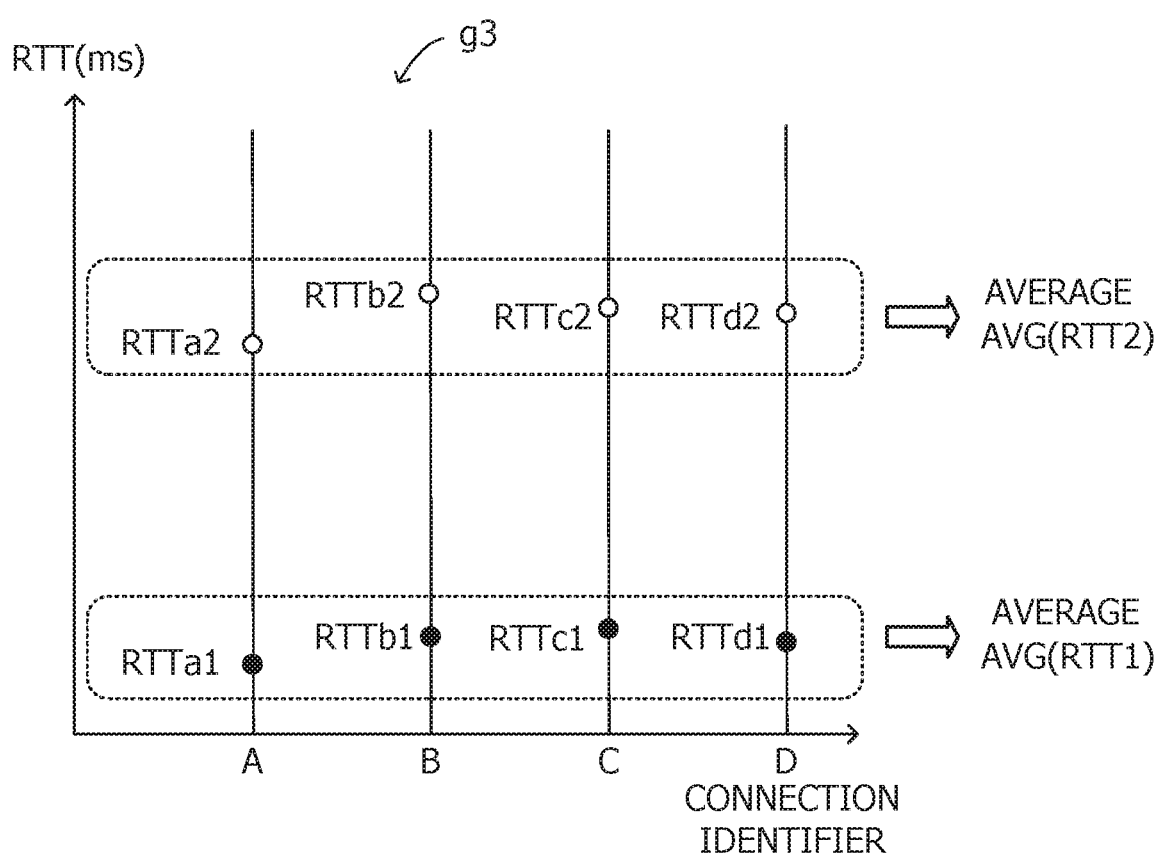
FIG. 8 is a view illustrating an example of an FW delay calculation (average delay calculation)

FIG. 8 is a view illustrating an example of the FW delay calculation. FIG. 8 represents an example of the average delay calculation. In FIG. 7, RTT1 and RTT2 are separately sorted in an ascending order, and (RTT2−RTT1) is calculated in an ascending order, so that FW delays are calculated.

Meanwhile, in FIG. 8, when all of the variations of RTT1 and RTT2 are small, an average value AVG(RTT1) of RTT1 and an average value AVG(RTT2) of RTT2 are obtained, and AVG(RTT2)−AVG(RTT1) is calculated, so that the FW delay is obtained. In addition, the "small variation" corresponds to a variation in the specific variation state.

The graph g3 represents the FW delay calculated based on the average of RTT. In the graph g3, the vertical axis represents RTT (ms), and the horizontal axis represents a connection identifier. In a connection A, RTTa1 is measured through the switch sw1, and RTTa2 is measured through the switch sw2. In a connection B, RTTb1 is measured through the switch sw1, and RTTb2 is measured through the switch sw2.

In a connection C, RTTc1 is measured through the switch sw1, and RTTc2 is measured through the switch sw2. In a connection D, RTTd1 is measured through the switch sw1, and RTTd2 is measured through the switch sw2.

When all of first variation states of RTTa1, RTTb1, RTTc1, and RTTd1 and second variation states of RTTa2, RTTb2, RTTc2, and RTTd2 are small, that is, the first and second variation states are in the specific variation state, the packet analysis device 10 performs the average delay calculation.

In this example, the packet analysis device 10 calculates the average value AVG(RTT1) of RTT1 measured at the switch sw1, that is, (RTTa1+RTTb1+RTTc1+RTTd1)/4. Further, the packet analysis device 10 calculates the average value AVG(RTT2) of RTT2 measured by the switch sw2, that is, (RTTa2+RTTb2+RTTc2+RTTd2)/4.

Then, the packet analysis device 10 calculates the FW delay by obtaining AVG(RTT2)−AVG(RTT1), and compares an FW delay maximum value among the FW delays in a predetermined time period with a predetermined threshold value. Then, when the appearance frequency or ratio of the FW delay maximum value is equal to or more than a predetermined threshold value, the packet analysis device 10 determines that the FW device 40 is in the overloaded state.

As described above, when the variation degrees of both RTT1 and RTT2 are small (when RTT1 and RTT2 are in the specific variation state), the packet analysis device 10 calculates the FW delay from the average value of RTT1 and the average value of RTT2. As a result, the sorting process illustrated in FIG. 7 may be omitted, so that the processing load may be reduced.

[Simulation Results]

Next, descriptions will be made on simulation results when the calculations are performed with actual data, in a case where the variations of RTT are relatively small and a case where the variations of RTT are relatively large.

Figure 9:
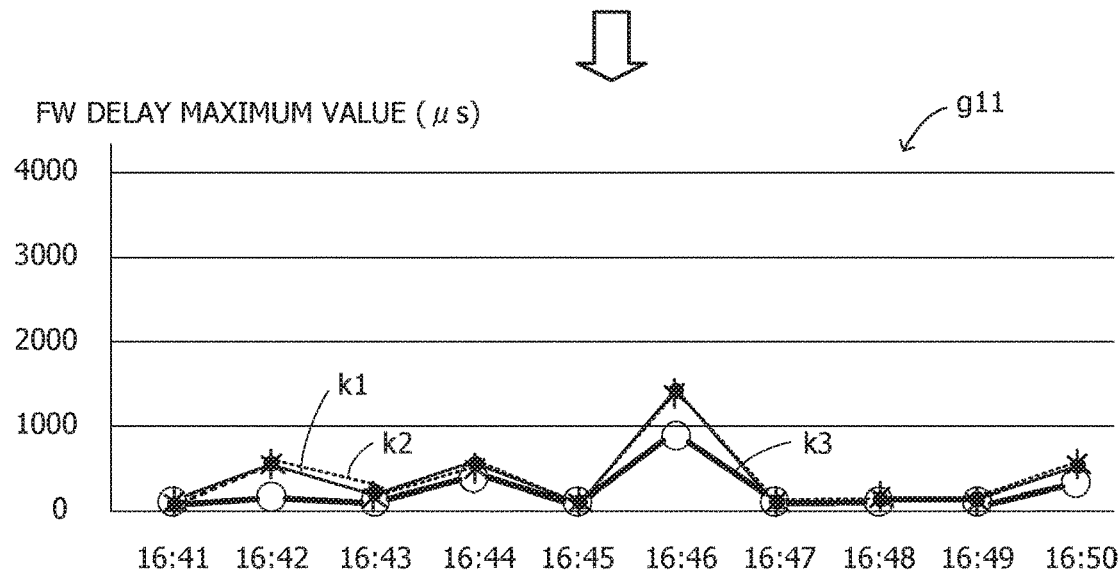
FIG. 9 is a view illustrating simulation results for an FW delay calculation when variations are small.

FIG. 9 is a view illustrating simulation results of the FW delay calculation in a case where the variations are small. Table Ta1 includes a time, the number of samples, an FW delay maximum value (correct answer value), an FW delay maximum value (sorting delay calculation), and an FW delay maximum value (average delay calculation), as items.

For example, a simulation is performed with 7 samples at a time 16:41. At this time, the correct answer value of the FW delay maximum value is 134. Further, the FW delay maximum value among FW delays obtained by the sorting delay calculation with the 7 samples is 134. Further, the FW delay maximum value among FW delays obtained by the average delay calculation using the 7 samples is 114.7143.

The graph g11 is obtained by making Table Ta1 into a graph. In the graph 11, the vertical axis represents the FW delay maximum value (μs), and the horizontal axis represents a time. The line k1 represents the correct answer value of the FW delay maximum value, the line k2 represents the FW delay maximum value (sorting delay calculation), and the line k3 represents the FW delay maximum value (average delay calculation).

As represented in the graph g11, it may be understood that when the variations of both RTT1 and RTT2 are relatively small, even the FW delay maximum value obtained based on the average delay calculation has a relatively small deviation from the correct answer value. Accordingly, when the variations of both RTT1 and RTT2 are relatively small, the packet analysis device 10 calculates the FW delay using the average delay calculation capable of reducing the processing load, as compared with the sorting delay calculation.

Figure 10:
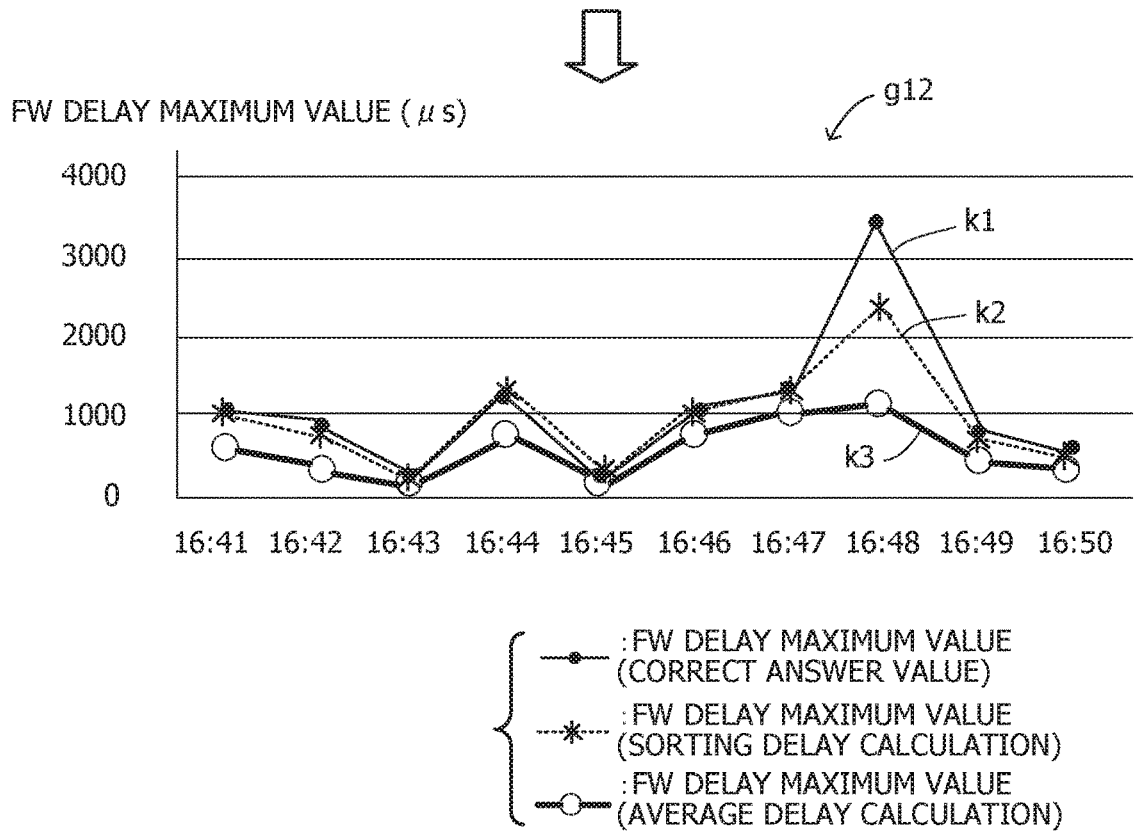
FIG. 10 is a view illustrating simulation results for an FW delay calculation when variations are large.

FIG. 10 is a view illustrating simulation results of the FW delay calculation in a case where the variations are large. Table Ta2 includes a time, the number of samples, an FW delay maximum value (correct answer value), an FW delay maximum value (sorting delay calculation), and an FW delay maximum value (average delay calculation), as items.

The graph g12 is obtained by making Table Ta2 into a graph. In the graph g12, the vertical axis represents the FW delay maximum value (μs), and the horizontal axis represents a time. The line k1 represents the correct answer value of the FW delay maximum value, the line k2 represents the FW delay maximum value (sorting delay calculation), and the line k3 represents the FW delay maximum value (average delay calculation).

As represented in the graph g12, it may be understood that when the variations of both RTT1 and RTT2 are not relatively small, the FW delay maximum value obtained based on the average delay calculation has a relatively large deviation from the correct answer value, and the FW delay maximum value obtained based on the sorting delay calculation has a small deviation from the correct answer value. Accordingly, when the variations of both RTT1 and RTT2 are not relatively small, the packet analysis device 10 detects the FW delay maximum value based on the FW delays obtained by the sorting delay calculation.

[Variation Determination]

Next, the process of determining the variations of RTT will be described with reference to FIGS. 11 to 14. FIG. 11 is a view illustrating an example of the variation determining process. In the graph g21, the vertical axis represents RTT, and the horizontal axis represents a time. The graph g21 represents a variation determination based on the transition of minimum values of RTT1 and maximum values of RTT2 that are measured 10 times for the past 10 minutes from 10:01 to 10:10.

$RTTa1_{min}$ is measured as the minimum value among a plurality of RTT1 measured through the switch sw1 at the time 10:01. Similarly, $RTTb1_{min}$ to $RTTj1_{min}$ are measured as the minimum values among a plurality of RTT1 measured through the switch sw1 at the times 10:02 to 10:10, respectively.

Further, $RTTa1_{max}$ is measured as the maximum value among a plurality of RTT1 measured through the switch sw1 at the time 10:01. Similarly, $RTTb1_{max}$ to $RTTj1_{max}$ are measured as the maximum values among a plurality of RTT1 measured through the switch sw1 at the times 10:02 to 10:10, respectively.

Figure 11:
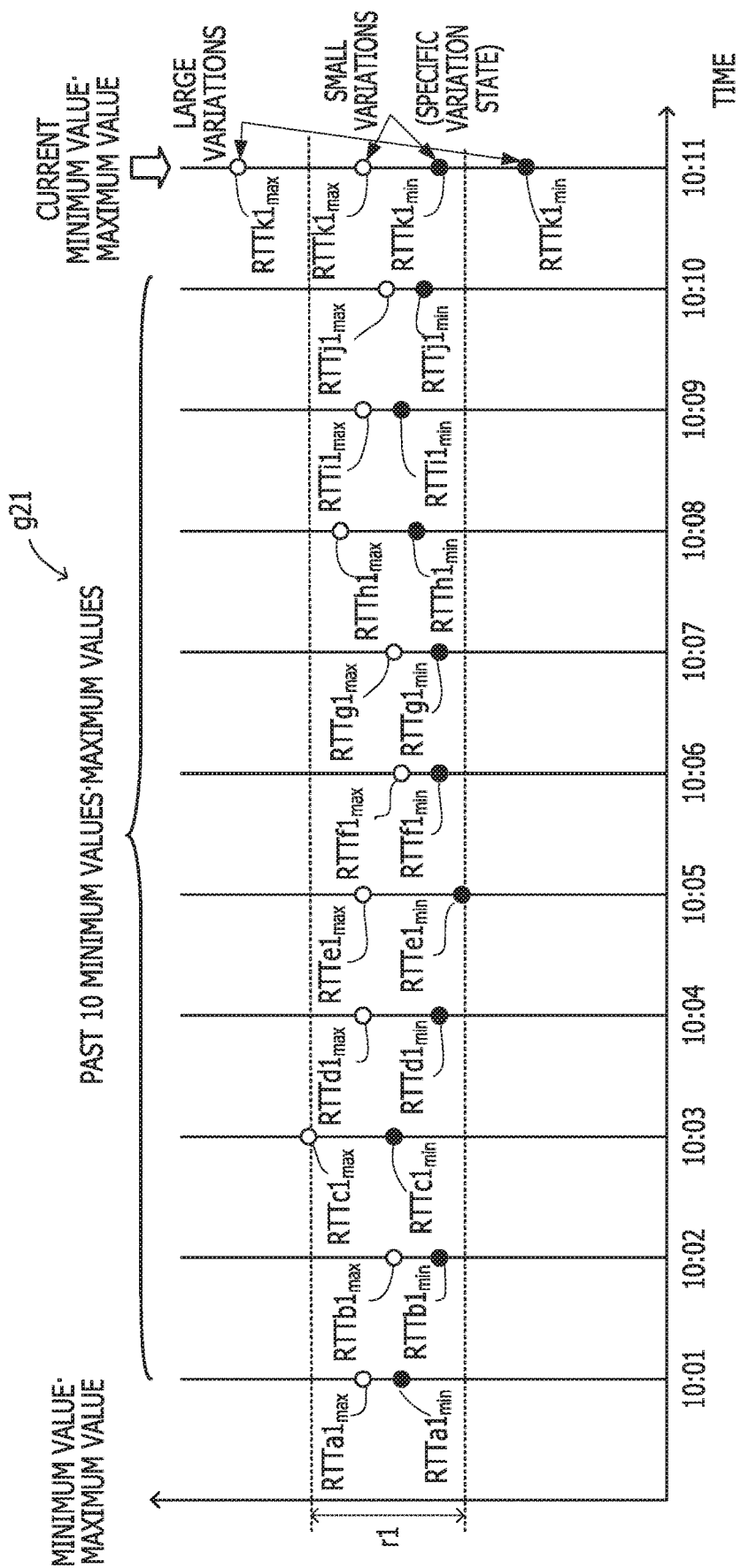
FIG. 11 is a view illustrating an example of a variation determining process.

In FIG. 11, the minimum value among $RTTa1_{min}$ to $RTTj1_{min}$ is $RTTe1_{min}$, the maximum value among $RTTa1_{max}$ to $RTTj1_{max}$ is $RTTc1_{max}$, and the range between $RTTe1_{min}$ and $RTTc1_{max}$ is defined as r1.

Meanwhile, it is assumed that at the time 10:11, $RTTk1_{min}$ is measured as the minimum value among a plurality of RTT1 measured through the switch sw1, and $RTTk1_{max}$ is measured as the maximum value among a plurality of RTT1 measured through the switch sw1.

Here, when $RTTk1_{min}$ and $RTTk1_{max}$ currently measured at the time 10:11 are present within the range r1, it is determined that the variations of $RTTk1_{min}$ and $RTTk1_{max}$ are relatively small. In this case, it is determined that the variation of $RTTk1_{min}$ measured at the time 10:11 and the variation of $RTTk1_{max}$ measured at the time 10:11 are relatively small, and thus, are in the specific variation state.

In addition, when either $RTTk1_{min}$ or $RTTk1_{max}$ is present outside the range r1, it is determined that the variations of $RTTk1_{min}$ and $RTTk1_{max}$ are relatively large. In this case, it is determined that the variation of $RTTk1_{min}$ measured at the time 10:11 and the variation of $RTTk1_{max}$ measured at the time 10:11 are not relatively small, and thus, are not in the specific variation state.

Accordingly, when it is determined that RTT1 are in the specific variation state based on the transition of the minimum and maximum values of RTT1 as described above, FW delays are calculated by the average delay calculation at the time 10:11, and the FW delay maximum value is detected. In addition, when it is determined that RTT1 are not in the specific variation state, FW delays are calculated by the sorting delay calculation at the time 10:11, and the FW delay maximum value is detected.

The variation determination for a plurality of RTT2 measured through the switch sw2 is performed in the same manner as that for RTT1.

The specific variation state is determined based on the transition of the minimum and maximum values of RTT1, and FW delays are calculated by the sorting delay calculation control, so that the association of connections is unnecessary, and the packet analysis device 10 is able to calculate the FW delays with a high accuracy, as compared to a case where the association of connections is performed.

Figure 12:
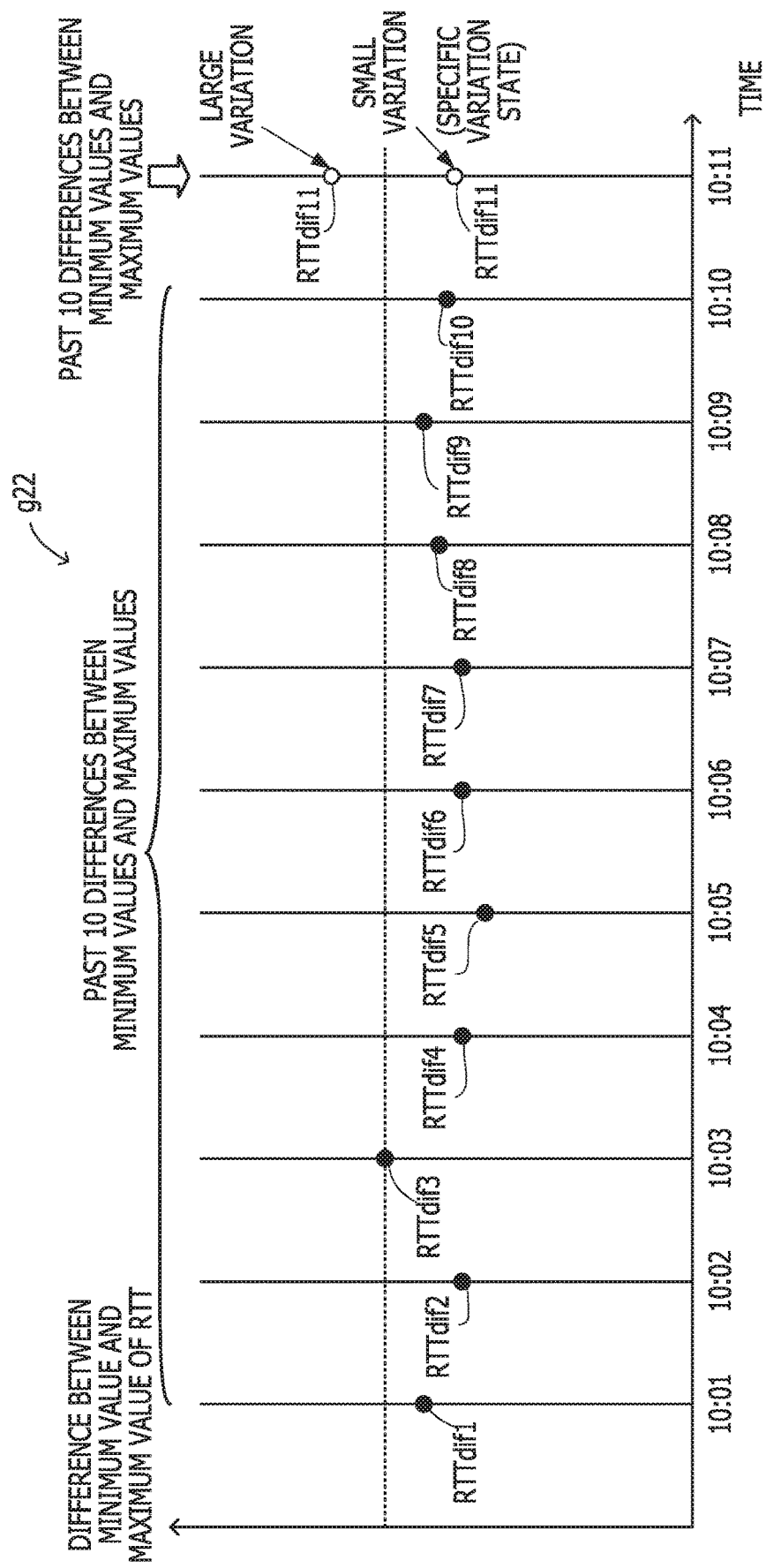
FIG. 12 is a view illustrating an example of a variation determining process.

FIG. 12 is a view illustrating an example of the variation determining process. In the graph g22, the vertical axis represents a difference between the minimum and maximum values of RTT, and the horizontal axis represents a time. FIG. 12 represents a variation determination based on the transition of differences between the minimum and maximum values of RTT1 measured 10 times for the past 10 times from 10:01 to 10:10.

At the time 10:01, RTTdif1 is measured as a difference between the minimum and maximum values of RTT1 measured through the switch sw1. Similarly, RTTdif2 to RTTdif10 are measured as differences between the minimum and maximum values of RTT1 at the times 10:02 to 10:10, respectively.

In FIG. 12, the maximum value among RTTdif1 to RTTdif10 is RTTdif3. In addition, it is assumed that at the time 10:11, RTTdif11 is measured as a difference between the minimum and maximum values of RTT1.

Here, when RTTdif11 currently measured at the time 10:11 is less than RTTdif3, it is determined that the variations of RTTdif1 to RTTdif11 are relatively small. In this case, it is determined that the variations of both the minimum and maximum values of RTT1 measured at the time 10:11 and used for calculating RTTdif are relatively small and are in the specific variation state.

In addition, when currently measured RTTdif11 is equal to or more than RTTdif3, it is determined that the variation of RTTdif11 is large. In this case, it is determined that the variations of both the minimum and maximum values of RTT1 measured at the time 10:11 are not relatively small and are not in the specific variation state.

Accordingly, when it is determined that the variations are in the specific variation state based on the transition of the differences between the minimum and maximum values of RTT1 as described above, FW delays are calculated by the average delay calculation at the time 10:11, and the FW delay maximum value is detected. In addition, when it is determined that the variations are not in the specific variation state, FW delays are calculated by the sorting delay calculation at the time 10:11, and the FW delay maximum value is detected.

The variation determination for a plurality of RTT2 measured through the switch sw2 is performed in the same manner as that for RTT1.

The specific variation state is determined based on the transition of the differences between the minimum and maximum values of RTT1, and FW delays are calculated by the sorting delay calculation control, so that the association of connections is unnecessary, and the packet analysis device 10 is able to calculate the FW delays with a high accuracy, as compared to a case where the association of connections is performed.

Figure 13:
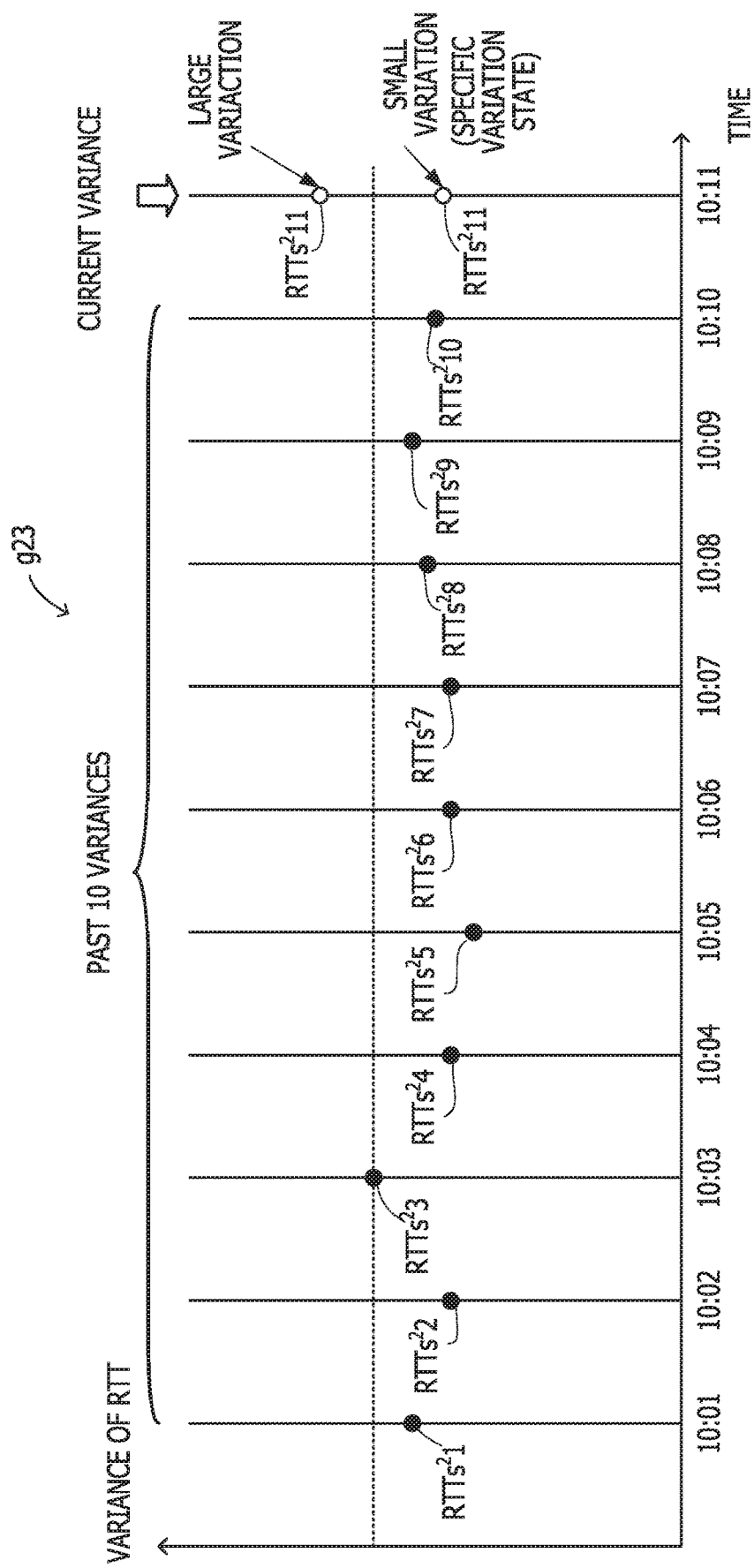
FIG. 13 is a view illustrating an example of a variation determining process.

FIG. 13 is a view illustrating an example of the variation determining process. In the graph g23, the vertical axis represents the variance of RTT, and the horizontal axis represents a time. FIG. 13 represents a variation determination based on the transition of variances when the variances are calculated as statistical information of RTT measured 10 times for the past 10 minutes from 10:01 to 10:10. A variance $s^2$ is calculated by an equation (1) below.

$$s^2 = \frac{1}{n}\sum_{i=1}^{n}(x_i - xm)^2 \qquad (1)$$

In addition, "n" is the total number of data, $x_i$ is an individual numerical value, and xm is an average value. For example, it is assumed that two RTT1a and RTT1b are acquired through the switch sw1 at the time t0. In this case, the variance $s^2$ at the time t0 is calculated from the equation (1) based on n=2, $x_1$=RTT1a, $x_2$=RTT1b, and $xm_1$=(RTT1a+RTT1b)/2. $RTTs^2 1$ is calculated as the variance of RTT1 at the time 10:01. Similarly, $RTTs^2 2$ to $RTTs^2 10$ are calculated as the variances of RTT1 at the times 10:02 to 10:10.

In FIG. 13, the maximum value among $RTTs^2 1$ to $RTTs^2 10$ is $RTTs^2 3$. In addition, it is assumed that $RTTs^2 11$ is calculated as the variance of RTT1 at the time 10:11.

Here, when $RTTs^2 11$ currently measured at the time 10:11 is less than $RTTs^2 3$, it is determined that the variation of $RTTs^2 11$ is relatively small. In this case, the variations of RTT1 are relatively small and are in the specific difference state.

In addition, when $RTTs^2 11$ currently measured at the time 10:11 is equal to or more than $RTTs^2 3$, it is determined that the variation of $RTTs^2 11$ is relatively large. In this case, it is determined that all of the variations of RTT1 are not relatively small and are not in the specific difference state.

Thus, when it is determined that the variations are in the specific variation state based on the transition of the variances of RTT1 as described above, FW delays are calculated by the average delay calculation at the time 10:11, and the FW delay maximum value is detected. In addition, when it is determined that the variations are not in the specific variation state, FW delays are calculated by the sorting delay calculation at the time 10:11, and the FW delay maximum value is detected.

The variation determination for a plurality of RTT2 measured through the switch sw2 is performed in the same manner as that for RTT1.

The specific variation state is determined based on the transition of the variances of RTT1, and FW delays are calculated by the sorting delay calculation control, so that the association of connections is unnecessary, and the packet analysis device 10 is able to calculate the FW delays with a high accuracy, as compared to a case where the association of connections is performed.

Figure 14:
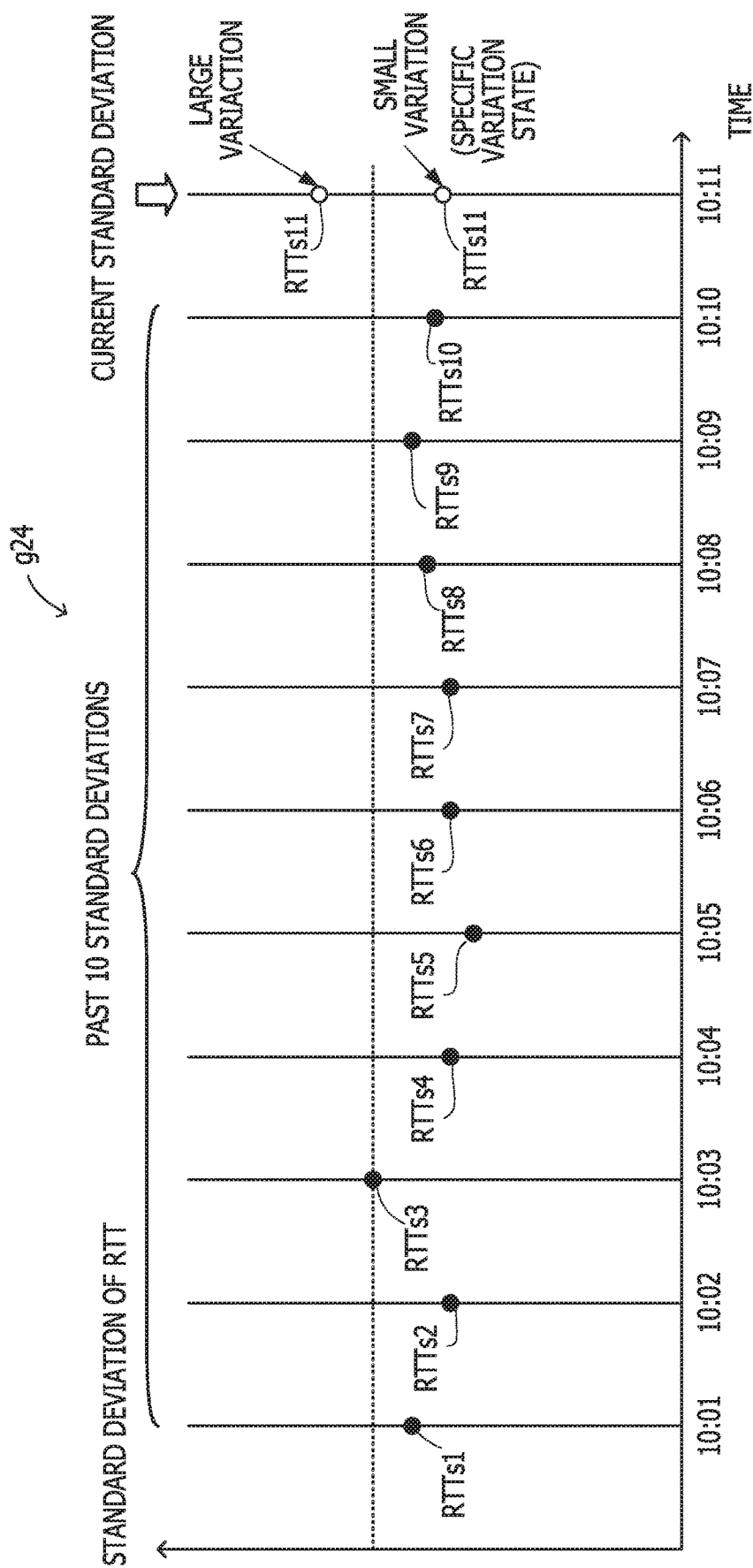
FIG. 14 is a view illustrating an example of a variation determining process.

FIG. 14 is a view illustrating an example of the variation determining process. In the graph g24, the vertical axis represents a standard deviation of RTT, and the horizontal axis represents a time. FIG. 14 represents a variation determination based on the transition of standard deviations when the standard deviations are calculated as statistical information of RTT measured 10 times for the past 10 minutes from 10:01 to 10:10. The standard deviation "s" is calculated from an equation (2) below. In addition, $s^2$ is the variance represented in the equation (1).

$$s = \sqrt{s^2} \qquad (2)$$

RTTs1 is calculated as a standard deviation of RTT1 at the time 10:01. Similarly, RTTs2 to RTTs10 are calculated as standard deviations of RTT1 at the times 10:02 to 10:10.

In FIG. 14, the maximum value among RTTs1 to RTTs10 is RTTs3.

In addition, it is assumed that RTTs11 is calculated as a standard deviation of RTT1 at the time 10:11.

Here, when RTTs11 currently measured at the time 10:11 is less than RTTs3, it is determined that the variation of RTTs11 is small. In this case, it is determined that the variations of RTT1 measured at the time 10:11 are small and are in the specific variation state.

In addition, when RTTs11 currently measured at the time 10:11 is equal to or more than RTTs3, it is determined that the variation of RTTs11 is relatively large. In this case, it is determined that all of the variations of RTT1 measured at the time 10:11 are not relatively small and are not in the specific variation state.

Accordingly, when it is determined that the variations are in the specific variation state based on the transition of the standard deviations of RTT1 as described above, FW delays are calculated by the average delay calculation at the time 10:11, and the FW delay maximum value is detected. In addition, when it is determined that the variations are not in the specific variation state, FW delays are calculated by the sorting delay calculation at the time 10:11, and the FW delay maximum value is detected.

The variation determination for a plurality of RTT2 measured through the switch sw2 is performed in the same manner as that for RTT1.

The specific variation state is determined based on the transition of the standard deviations of RTT1, and FW delays are calculated by the sorting delay calculation control, so that the association of connections is unnecessary, and the packet analysis device 10 is able to calculate the FW delays with a high accuracy, as compared to a case where the association of connections is performed.

Further, by performing the variation determining process as illustrated in FIGS. 11 to 14 above, the variation degrees of RTT1 and RTT2 may be determined with a high accuracy.

[Flowchart]

Figure 15:
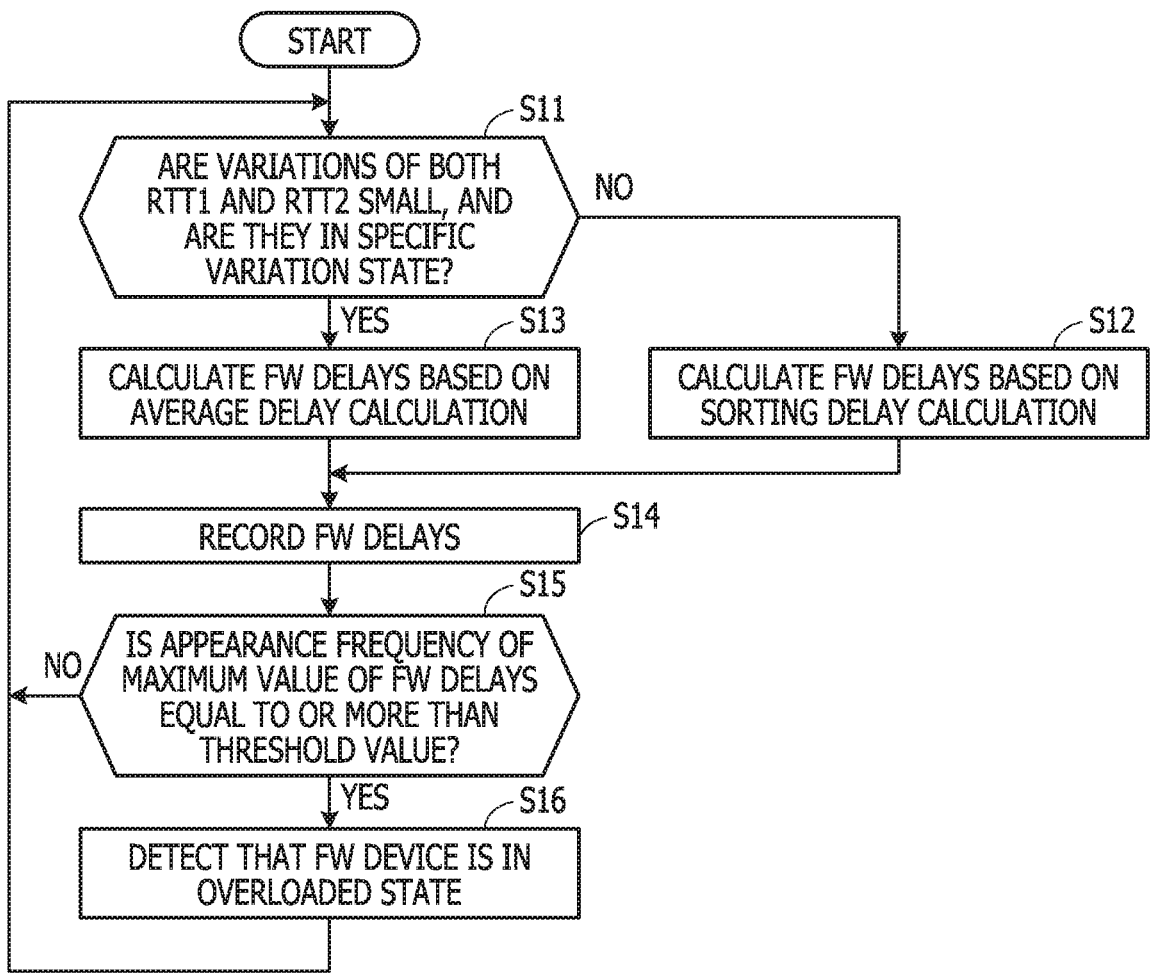
FIG. 15 is a flowchart illustrating an operation of the packet analysis device.

FIG. 15 is a flowchart illustrating the operation of the packet analysis device.

(Operation S11) The controller 11 determines whether the variations of RTT1 and RTT2 are relatively small and are in the specific variation state. When it is determined that the variations of both RTT1 and RTT2 are relatively small and are in the specific variation state, the process proceeds to operation S13. When it is determined that the variations of RTT1 or RTT2 are not relatively small and are not in the specific variation state, the process proceeds to operation S12.

(Operation S12) The controller 11 calculates the FW delays using the sorting delay calculation.

(Operation S13) The controller 11 calculates the FW delays using the average delay calculation.

(Operation S14) The controller 11 records the FW delays.

(Operation S15) In the time period for determining the overload of the FW device 40, the controller 11 detects the FW delay maximum value among the recorded FW delays, and determines whether the appearance frequency of the FW delay maximum value is equal to or more than a threshold value. When it is determined that the appearance frequency is equal to or more than the threshold value, the process proceeds to operation S16. When it is determined that the appearance frequency is less than the threshold value, the process returns to operation S11.

(Operation S16) The controller 11 detects that the FW device 40 is in the overloaded state.

Figure 16:
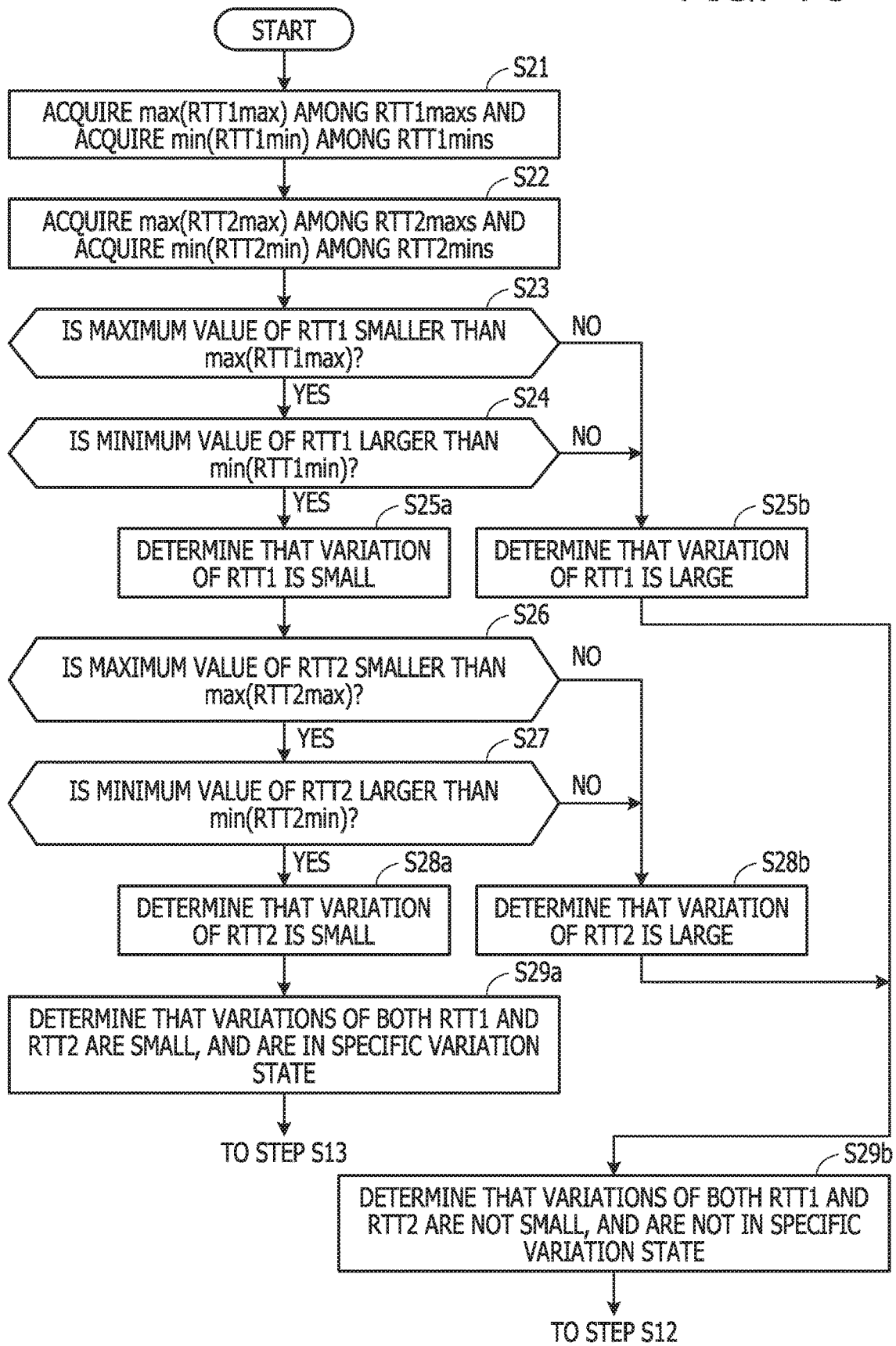
FIG. 16 is a flowchart illustrating an operation of a variation determination.

FIG. 16 is a flowchart illustrating the operation of the variation determination. FIG. 16 represents the flow of the variation determining process in operation S1 illustrated in FIG. 15, based on the transition of the maximum and minimum values of RTT1 as described above in FIG. 11.

(Operation S21) The controller 11 detects RTT1max which is the maximum RTT1 among a plurality of RTT1 acquired at specific measurement times, and detects the maximum value max(RTT1max) of RTT1maxes at a plurality of past measurement times (e.g., the past 10 times). The controller 11 detects RTT1 min which is the minimum RTT1 among a plurality of RTT1 acquired at specific measurement times, and detects the minimum value min (RTT1 min) of RTT1 mins at a plurality of past measurement times (e.g., the past 10 times).

(Operation S22) The controller 11 detects RTT2max which is the maximum RTT2 among a plurality of RTT2 acquired at specific measurement times, and detects the maximum value max(RTT2max) among RTT2maxes at a plurality of past measurement times (e.g., the past 10 times). The controller 11 detects RTT2 min which is the minimum RTT2 among a plurality of RTT2 acquired at specific measurement times, and detects the minimum value min (RTT2 min) of RTT2 mins at a plurality of past measurement times (e.g., the past 10 times).

(Operation S23) The controller 11 detects the maximum value among RTT1 acquired at the current measurement time, and determines whether the maximum value of RTT1 is smaller than max(RTT1max). When it is determined that the maximum value is smaller than max(RTT1max), the process proceeds to operation S24. When it is determined that the maximum value is not smaller than max(RTT1max), the process proceeds to operation S25b.

(Operation S24) The controller 11 detects the minimum value among RTT1 acquired at the current measurement time, and determines whether the minimum value of RTT1 is larger than min(RTT1 min). When it is determined that the minimum value is larger than min(RTT1 min), the process proceeds to operation S25a. When it is determined that the minimum value is not larger than min(RTT1 min), the process proceeds to operation S25b.

(Operation S25a) The controller 11 determines that the variations of RTT1 are relatively small. The process proceeds to operation S26.

(Operation S25b) The controller 11 determines that the variations of RTT1 are relatively large. The process proceeds to operation S29b.

(Operation S26) The controller 11 detects the maximum value among RTT2 acquired at the current measurement time, and determines that the maximum value of RTT2 is smaller than max(RTT2max). When it is determined that the maximum value is smaller than max(RTT2max), the process proceeds to operation S27. When it is determined that the maximum value is not smaller than max(RTT2max), the process proceeds to operation S28b.

(Operation S27) The controller 11 detects the minimum value among RTT2 acquired at the current measurement time, and determines whether the minimum value of RTT2 is larger than min(RTT2 min). When it is determined that the minimum value is larger than min(RTT2 min), the process proceeds to operation S28a. When it is determined that the minimum value is not larger than min(RTT2 min), the process proceeds to operation S28b.

(Operation S28a) The controller 11 determines that the variations of RTT2 are relatively small. The process proceeds to operation S29a.

(Operation S28b) The controller 11 determines that the variations of RTT2 are relatively large. The process proceeds to operation S29b.

(Operation S29a) The controller 11 determines that the variations of both RTT1 and RTT2 are relatively small and are in the specific variation state (Then, the process proceeds to operation S13 of FIG. 15).

(Operation S29b) The controller 11 determines that the variations of RTT1 or RTT2 are not relatively small and are not in the specific variation state (Then, the process proceeds to operation S12 of FIG. 15).

Figure 17:
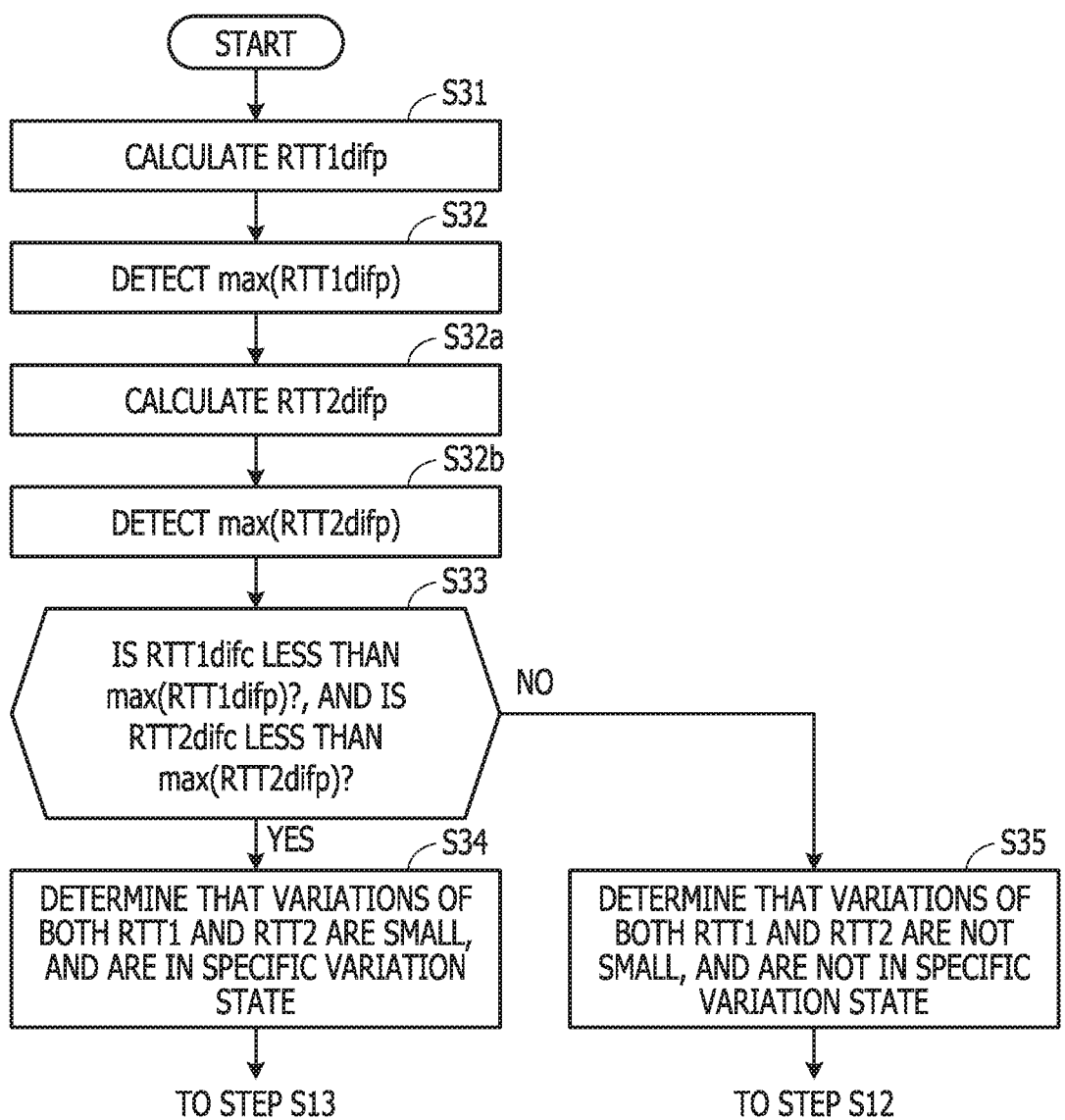
FIG. 17 is a flowchart illustrating an operation of a variation determination.

FIG. 17 is a flowchart illustrating the operation of the variation determination. FIG. 17 represents the flow of the variation determining process in operation S1 illustrated in FIG. 15, based on the transition of the differences between the minimum and maximum values of RTT1 as described above in FIG. 12.

(Operation S31) The controller 11 detects RTT1 min which is the minimum RTT1 among a plurality of RTT1 acquired at specific measurement times, and RTT1max which is the maximum RTT1 among the plurality of RTT1 acquired at the specific measurement times, and calculates RTT1difp which is the difference between RTT1 min and RTT1max.

(Operation S32) The controller 11 detects max(RTT1difp) which is the maximum value among RTT1difp calculated at a plurality of past measurement times.

(Operation S32a) The controller 11 detects RTT2 min which is the minimum RTT2 among the plurality of RTT2 acquired at specific measurement times, and RTT2max which is the maximum RTT2 among the plurality of RTT2 acquired at the specific measurement times, and calculates RTT2difp which is the difference between RTT2 min and RTT2max.

(Operation S32b) The controller 11 detects max (RTT2difp) which is the maximum value among RTT2difp calculated at a plurality of past measurement times.

(Operation S33) The controller 11 obtains RTT1difc by calculating the difference between the minimum value and the maximum value among RTT1 acquired at the current measurement time, and obtains RTT2difc by calculating the difference between the minimum value and the maximum value among RTT2 acquired at the current measurement time. Then, the controller 11 determines whether RTT1difc is less than max(RTT1difp), and determines whether RTT2difc is less than max(RTT2difp).

When it is determined that RTT1difc is less than max (RTT1difp), and RTT2difc is less than max(RTT2difp), the process proceeds to operation S34. Meanwhile, for example, when it is determined that RTT1difc is equal to or more than max(RTT1difp), the process proceeds to operation S35.

(Operation S34) The controller 11 determines that the variations of both RTT1 and RTT2 are relatively small and are in the specific variation state (Then, the process proceeds to operation S13 of FIG. 15).

(Operation S35) The controller 11 determines that the variations of both RTT1 and RTT2 are not both small and not in the specific variation state (Then, the process proceeds to operation S12 of FIG. 15).

Figure 18:
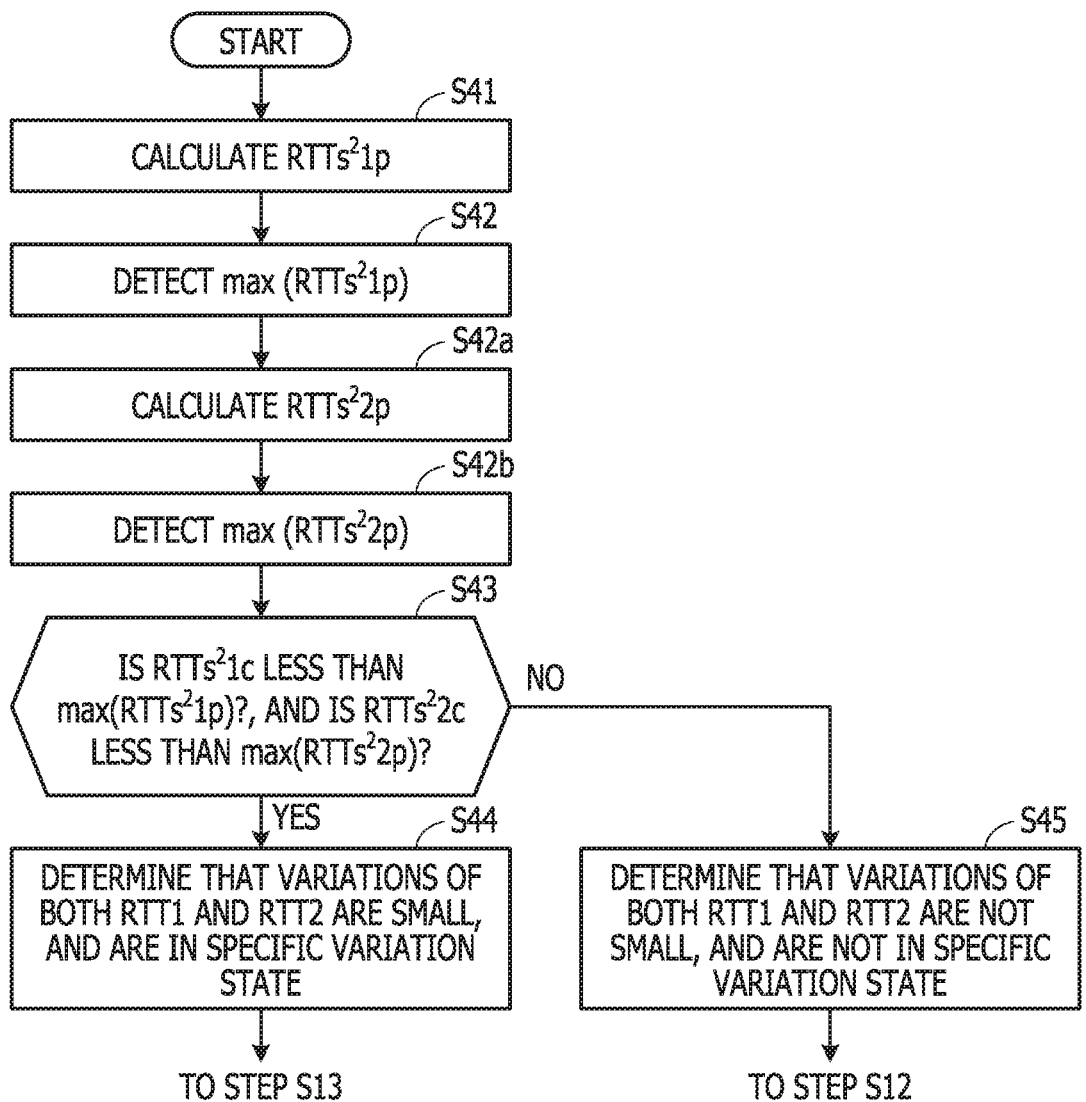
FIG. 18 is a flowchart illustrating an operation of a variation determination.

FIG. 18 is a flowchart illustrating the operation of the variation determination. FIG. 18 represents the flow of the variation determining process in operation S1 illustrated in FIG. 15, based on the transition of the variances of RTT1 and RTT2 as described above in FIG. 13.

(Operation S41) The controller 11 calculates $RTTs^2 1p$ which is the variance of a plurality of RTT1 acquired at specific measurement times.

(Operation S42) The controller 11 detects $max(RTTs^2 1p)$ which is the maximum value among $RTTs^2 1p$ calculated at a plurality of past measurement times.

(Operation S42a) The controller 11 calculates $RTTs^2 2p$ which is the variance of a plurality of RTT2 acquired at specific measurement times.

(Operation S42b) The controller 11 detects $max(RTTs^2 2p)$ which is the maximum value among $RTTs^2 2p$ calculated at a plurality of past measurement times.

(Operation S43) The controller 11 calculates $RTTs^2 1c$ which is the variance of RTT1 acquired at the current measurement time, and $RTTs^2 2c$ which is the variance of RTT2 acquired at the current measurement time. Then, the controller 11 determines whether $RTTs^2 1c$ is less than $max(RTTs^2 1p)$ and determines whether $RTTs^2 2c$ is less than $max(RTTs^2 2p)$.

When it is determined that $RTTs^2 1c$ is less than max $(RTTs^2 1p)$, and $RTTs^2 2c$ is less than $max(RTTs^2 2p)$, the process proceeds to operation S44. Meanwhile, for example, when it is determined that $RTTs^2 2c$ is equal to or more than $max(RTTs^2 2p)$, the process proceeds to operation S45.

(Operation S44) The controller 11 determines that the variations of both RTT1 and RTT2 are relatively small and are in the specific variation state (Then, the process proceeds to operation S13 of FIG. 15).

(Operation S45) The controller 11 determines that the variations of both RTT1 and RTT2 are not small and are not in the specific variation state (Then, the process proceeds to operation S12 of FIG. 15).

Figure 19:
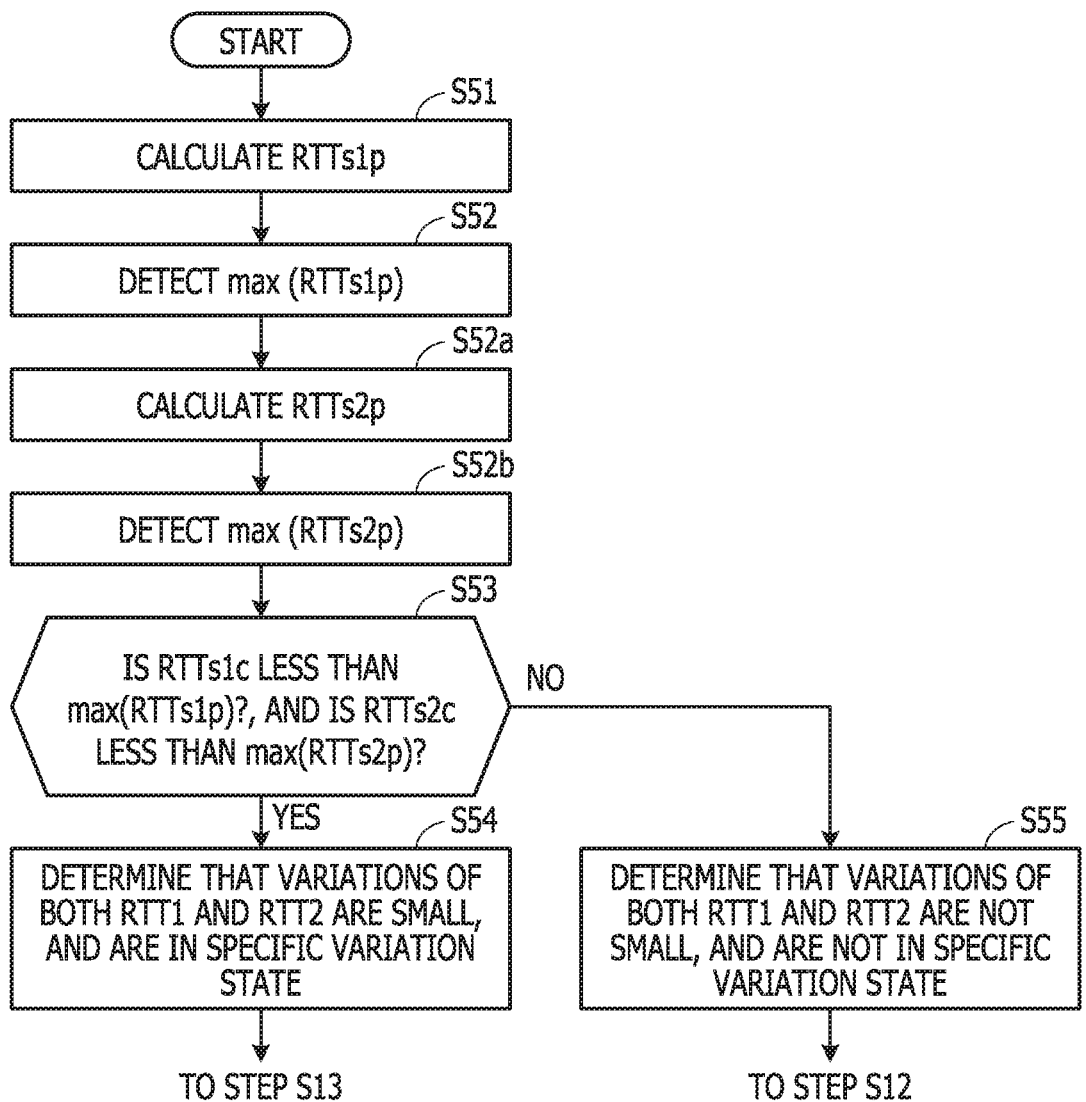
FIG. 19 is a flowchart illustrating an operation of a variation determination.

FIG. 19 is a flowchart illustrating the operation of the variation determination. FIG. 19 represents the flow of the variation determining process in operation S1 illustrated in FIG. 15, based on the transition of the standard deviations of RTT1 and RTT2 as described above in FIG. 14.

(Operation S51) The controller 11 calculates $RTTs1p$ which is the standard deviation of a plurality of RTT1 acquired at specific measurement times.

(Operation S52) The controller 11 detects $max(RTTs1p)$ which is the maximum value among $RTTs1p$ calculated at a plurality of past measurement times.

(Operation S52a) The controller 11 calculates $RTTs2p$ which is the standard deviation of a plurality of RTT2 acquired at specific measurement times.

(Operation S52b) The controller 11 detects $max(RTTs2p)$ which is the maximum value among $RTTs2p$ calculated at a plurality of past measurement times.

(Operation S53) The controller 11 calculates $RTTs1c$ which is the standard deviation of RTT1 acquired at the current measurement time, and $RTTs2c$ which is the standard deviation of RTT2 acquired at the current measurement time. Then, the controller 11 determines whether $RTTs1c$ is less than $max(RTTs1p)$, and determines whether $RTTs2c$ is less than $max(RTTs2p)$.

When it is determined that $RTTs1c$ is less than max $(RTTs1p)$, and $RTTs2c$ is less than $max(RTTs2p)$, the process proceeds to operation S54. Meanwhile, for example, when it is determined that $RTTs2c$ is equal to or more than $max(RTTs2p)$, the process proceeds to operation S55.

(Operation S54) The controller 11 determines that the variations of both RTT1 and RTT2 are relatively small and are in the specific variation state (Then, the process proceeds to operation S13 of FIG. 15).

(Operation S55) The controller 11 determines that the variations of both RTT1 and RTT2 are not relatively small and are not in the specific variation state (Then, the process proceeds to operation S12 of FIG. 15).

[FW Delay Calculation Time Period]

Figure 20:
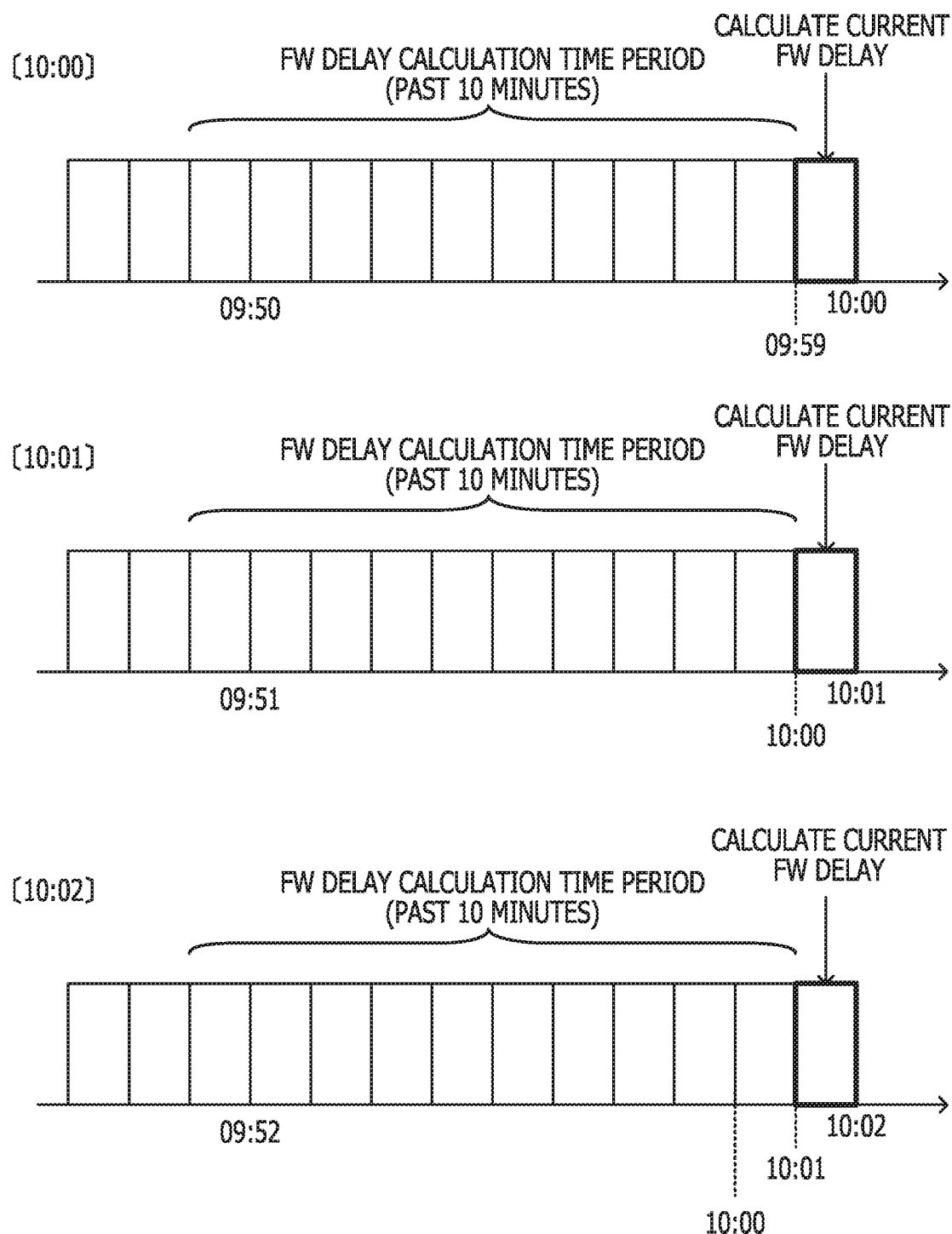
FIG. 20 is a view illustrating an example of an FW delay calculation time period.

FIG. 20 is a view illustrating an example of an FW delay calculation time period.

(Time 10:00) The controller 11 sets the time period from 09:50 to 09:59 during which the FW delays are calculated, as the past 10-minute time period for the FW delay calculation. Further, the controller 11 calculates the current FW delays based on RTT1 and RTT2 acquired at the time 10:00.

(Time 10:01) The controller 11 sets the time period from 09:51 to 10:00 during which the FW delays are calculated, as the past 10-minute time period for the FW delay calculation. Further, the controller 11 calculates the current FW delays based on RTT1 and RTT2 acquired at the time 10:01.

(Time 10:02) The controller 11 sets the time period from 09:52 to 10:01 during which the FW delays are calculated, as the past 10-minute time period for the FW delay calculation. Further, the controller 11 calculates the current FW delays based on RTT1 and RTT2 acquired at the time 10:02.

[Overload Determination Time Period]

Figure 21:
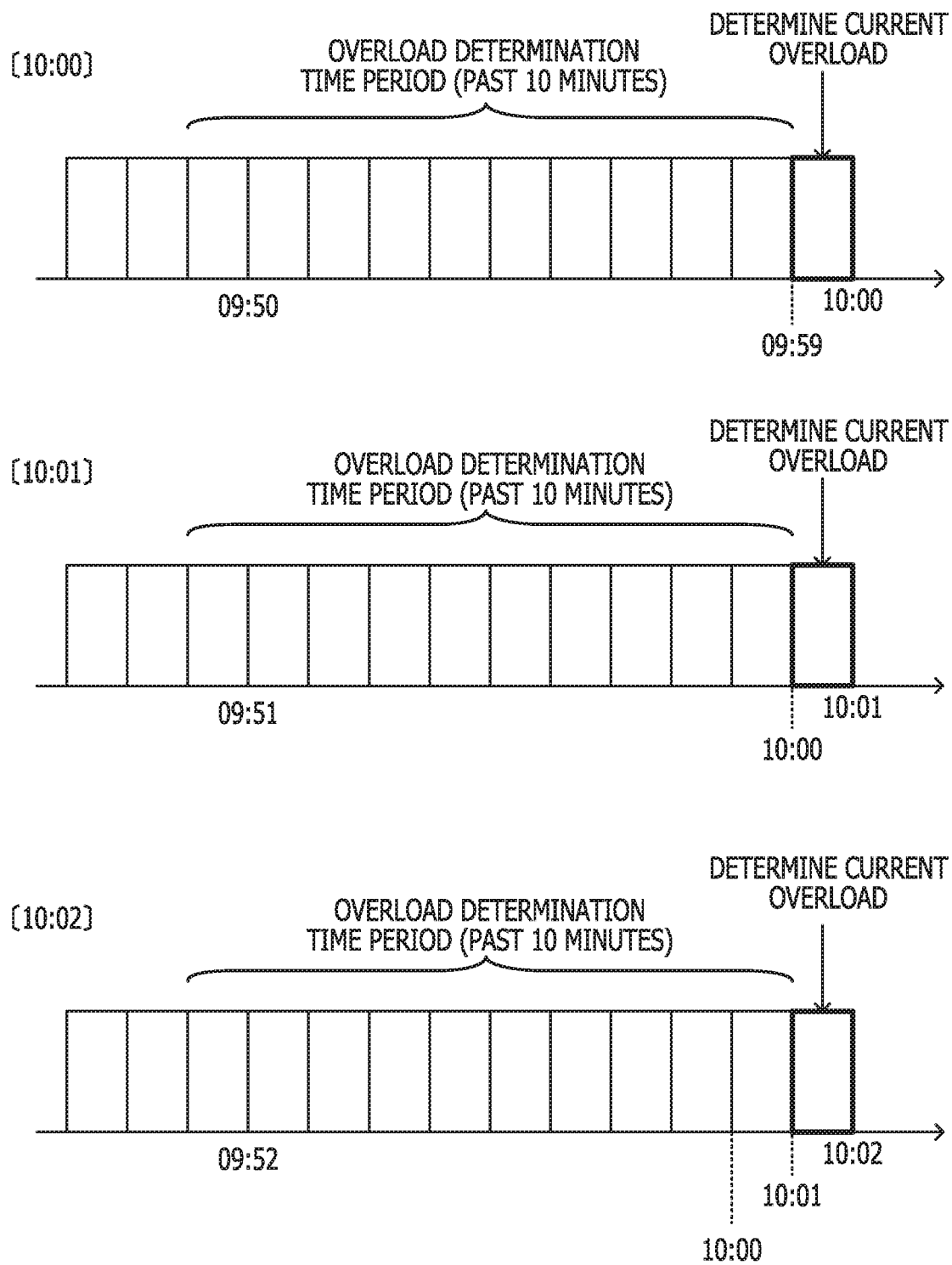
FIG. 21 is a view illustrating an example of an overload determination time period.

FIG. 21 is a view illustrating an example of an overload determination time period.

(Time 10:00) The controller 11 sets the time period from 09:50 to 09:59 during which the overload determinations are performed, as the past 10-minute time period for the overload determination. Further, the controller 11 performs the current overload determination based on RTT1 and RTT2 acquired at the time 10:00.

(Time 10:01) The controller 11 sets the time period from 09:51 to 10:00 during which the overload determinations are performed, as the past 10-minute time period for the overload determination. Further, the controller 11 performs the current overload determination based on RTT1 and RTT2 acquired at the time 10:01.

(Time 10:02) The controller 11 sets the time period from 09:52 to 10:01 during which the overload determinations are performed, as the past 10-minute time period for the overload determination. Further, the controller 11 performs the current overload determination based on RTT1 and RTT2 acquired at the time 10:02.

As described above, the packet analysis device 10 of the second embodiment determines whether the variation states of RTT1 and RTT2 are in the specific variation state, and obtains the difference between the average value of RTT1 and the average value of RTT2 so as to calculate the FW delays, when the variation states of RTT1 and RTT2 are in the specific variation state.

In addition, when the variation states of RTT1 and RTT2 are not in the specific variation state, the packet analysis device 10 sorts RTT1 in an ascending order, and sorts RTT2 in an ascending order. Then, the packet analysis device 10 obtains the differences between RTT1 and RTT2 in an ascending order, so as to calculate the FW delays. Then, the packet analysis device 10 detects the FW delay maximum value among the calculated FW delays, and compares the FW delay maximum value with a threshold value. With this control, it is possible to relatively early detect the overloaded state with a high accuracy.

The processing functions of the packet analysis devices 1 and 10 of the present disclosure described above may be implemented by a computer. In this case, programs that describe the contents of the processing functions of the packet analysis devices 1 and 10 are provided. When the computer executes the programs, the processing functions are implemented on the computer.

The programs that describe the processing contents may be recorded in a computer-readable recording medium. Examples of the computer-readable recording medium include a magnetic storage device, an optical disk, a magneto-optical recording medium, a semiconductor memory, and others. Examples of the magnetic storage device include a hard disk device (HDD), a flexible disk (FD), a magnetic tape, and others. Examples of the optical disk include a CD-ROM/RW and others. Examples of the magneto-optical recording medium include an MO (magneto optical disk) and others.

In a case where the programs are distributed, for example, a portable recording medium such as a CD-ROM in which the programs are recorded is available in the market. Alternatively, the programs may be stored in a storage device of a server computer, and may be transferred from the server computer to another computer via a network.

The computer that executes the programs stores, for example, the programs recorded in the portable recording medium or the programs transferred from the server computer, in its own storage device. Then, the computer reads the programs from the own storage device, and executes the processing according to the programs. In addition, the computer may read the programs directly from the portable recording medium, and execute the processing according to the programs.

In addition, each time a program is transferred from the server computer coupled to the computer via the network, the computer may execute the processing according to the received program. In addition, at least a portion of the processing functions described above may be implemented by an electronic circuit such as a DSP, an ASIC, a PLD or the like.

While the embodiments have been described, the configuration of each unit described in the embodiments may be replaced with another configuration having the same function as that of the unit. In addition, other arbitrary components or steps may be added. In addition, any two or more components (features) described in the embodiments may be combined with each other.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a packet analysis program that causes a computer to execute a process, the process comprising:
   acquiring, from a relay device that relays packets between a first communication device and a second communication device, a plurality of first delay times generated by a round trip of the packets between the first communication device and the relay device, and a plurality of second delay times generated by a round trip of the packets between the second communication device and the relay device;
   sorting the plurality of first delay times separately from the plurality of second delay times, based on delay time length;
   calculating device delay times based on a first delay calculation that calculates for each device delay time a corresponding difference between one of the plurality of first delay times and one of the plurality of second delay times in a same rank after the sorting; and
   operating the relay device based on the device delay times.

2. The non-transitory computer-readable recording medium according to claim 1, the process further comprising:
   detecting a device delay maximum value among the device delay times calculated in a predetermined time period; and
   detecting an overload state of the relay device when an appearance frequency or ratio of the device delay maximum value is equal to or more than a predetermined threshold value.

3. The non-transitory computer-readable recording medium according to claim 1, wherein the process:
   calculates the device delay times based on the first delay calculation, when first variation states of the plurality of first delay times acquired in a predetermined time period and second variation states of the plurality of second delay times acquired in the predetermined time period are not in a specific variation state, and calculates the device delay times based a second delay calculation that calculates an average difference between a first average value of the plurality of first delay times and a second average value of the plurality of second delay times, when the first variation states and the second variation states are in the specific variation state.

4. The non-transitory computer-readable recording medium according to claim 3, wherein the process:

detects a plurality of first minimum values from the plurality of first delay times acquired in a first predetermined time period, to acquire a second minimum value which is a minimum value among the plurality of first minimum values, detects a plurality of first maximum values from the plurality of second delay times acquired in the first predetermined time period, to acquire a second maximum value which is a maximum value among the plurality of first maximum values, and detects that the first variation states and the second variation states are in the specific variation state, when a third minimum value among the plurality of first delay times acquired in a second predetermined time period and a third maximum value among the plurality of second delay times acquired in the second predetermined time period are both present within a range from the second minimum value to the second maximum value.

5. The non-transitory computer-readable recording medium according to claim 3, wherein the process:

calculates a plurality of first difference values which are each a difference value between a minimum value among the plurality of first delay times acquired in the first predetermined time period and a maximum value among the plurality of second delay times acquired in the first predetermined time period, detects a maximum difference value among the plurality of first difference values, calculates a second difference value which is a difference value between a minimum value among the plurality of first delay times acquired in the second predetermined time period and a maximum value among the plurality of second delay times acquired in the second predetermined time period, and determines that the first variation states and the second variation states are in the specific variation state in the predetermined time period from the first predetermined time period to the second predetermined time period, when the second difference value is less than the maximum difference value.

6. The non-transitory computer-readable recording medium according to claim 3, wherein the process:

calculates first statistical information from the plurality of first delay times acquired in the first predetermined time period and the plurality of second delay times acquired in the first predetermined time period, detects a maximum value in the first statistical information;

calculates second statistical information from the plurality of first delay times acquired in the second time and the plurality of second delay times acquired in the second predetermined time period; and determines that the first variation states and the second variation states are in the specific variation state in the predetermined time period from the first predetermined time period to the second predetermined time period, when the second statistical information is less than the maximum value.

7. The non-transitory computer-readable recording medium according to claim 6, wherein the process calculates variances of the plurality of first delay times and the plurality of second delay times, or standard deviations of the plurality of first delay times and the plurality of second delay times, as the first statistical information and the second statistical information.

8. The non-transitory computer-readable recording medium according to claim 1, wherein the operating includes detecting an overload state of the relay device when a maximum delay time, among the device delay times, exceeds a threshold.

9. The non-transitory computer-readable recording medium according to claim 8, wherein the operating includes issuing instructions to a network connected to the relay device when the overload state of the relay device is detected.

10. A packet analysis method comprising:

acquiring, from a relay device that relays packets between a first communication device and a second communication device, a plurality of first delay times generated by a round trip of the packets between the first communication device and the relay device, and a plurality of second delay times generated by a round trip of the packets between the second communication device and the relay device;

sorting the plurality of first delay times separately from the plurality of second delay times based on a length of a delay time;

calculating device delay times, each based on a difference between one of the plurality of first delay times and one of the plurality of second delay times in a same rank after the sorting, by a processor; and operating the relay device based on the device delay times.

11. The packet analysis method according to claim 10, further comprising detecting an overload state of the relay device when a maximum delay time, among the device delay times, exceeds a threshold.

12. The packet analysis method according to claim 11, further comprising issuing instructions to a network connected to the relay device when the overload state of the relay device is detected.

13. A packet analysis device comprising:

a memory;

a processor coupled to the memory and configured to;

acquire, from a relay device that relays packets between a first communication device and a second communication device, a plurality of first delay times generated by a round trip of the packets between the first communication device and the relay device, and a plurality of second delay times generated by a round trip of the packets between the second communication device and the relay device, sort the plurality of first delay times separately from the plurality of second delay times based on a length of a delay time, calculate device delay times, each based on a difference between one of the plurality of first delay times and one of the plurality of second delay times in a same rank after the sorting; and operate the relay device based on the device delay times.

14. The packet analysis device according to claim 13, wherein the processor is further configured to detect an overload state of the relay device when a maximum delay time, among the device delay times, exceeds a threshold.

15. The packet analysis device according to claim 14, wherein the packet analysis device is connected to a network, and wherein the packet analysis device further comprises a network interface configured to issue instructions to the network when the overload state of the relay device is detected.

\* \* \* \* \*